(12) United States Patent
Kuroda et al.

(10) Patent No.: US 9,864,143 B2
(45) Date of Patent: Jan. 9, 2018

(54) DIRECTIONAL COUPLING-TYPE MULTI-DROP BUS

(71) Applicant: KEIO UNIVERSITY, Tokyo (JP)

(72) Inventors: Tadahiro Kuroda, Yokohama (JP); Hiroki Ishikuro, Yokohama (JP)

(73) Assignee: KEIO UNIVERSITY, Tokyo (JP)

( * ) Notice: Subject to any disclaimer, the term of this patent is extended or adjusted under 35 U.S.C. 154(b) by 587 days.

(21) Appl. No.: 14/461,056

(22) Filed: Aug. 15, 2014

(65) Prior Publication Data
US 2014/0355935 A1 Dec. 4, 2014

Related U.S. Application Data

(63) Continuation of application No. PCT/JP2013/053012, filed on Feb. 8, 2013.

(30) Foreign Application Priority Data

Feb. 17, 2012 (JP) ................. 2012-032711

(51) Int. Cl.
*H04L 25/02* (2006.01)
*G02B 6/293* (2006.01)

(52) U.S. Cl.
CPC ........ *G02B 6/2932* (2013.01); *H04L 25/0266* (2013.01); *H04L 25/0272* (2013.01); *H04L 25/0278* (2013.01)

(58) Field of Classification Search
CPC ............. H04L 25/0266; H04L 25/0272; H04L 25/0278; G02B 6/2932; H01P 5/00; H01P 5/12–5/18
See application file for complete search history.

(56) References Cited

U.S. PATENT DOCUMENTS

| 3,619,504 | A | 11/1971 | De Veer et al. |
| 5,638,402 | A | 6/1997 | Osaka et al. |
| 6,111,476 | A | 8/2000 | Williamson |
| 6,438,012 | B1 | 8/2002 | Osaka et al. |
| 6,625,682 | B1 | 9/2003 | Simon et al. |

(Continued)

FOREIGN PATENT DOCUMENTS

| JP | 7-141079 A | 6/1995 |
| JP | 2001-27987 A | 1/2001 |

(Continued)

OTHER PUBLICATIONS

Benham et al., "An Alignment Insensitive Separable Electromagnetic Coupler for High-Speed Digital Multidrop Bus Applications", IEEE Transactions on Microwave Theory and Techniques, vol. 51, No. 12, Dec. 2003, pp. 2597-2598.

(Continued)

*Primary Examiner* — Vuthe Siek
*Assistant Examiner* — Aric Lin
(74) *Attorney, Agent, or Firm* — Westerman, Hattori, Daniels & Adrian

(57) ABSTRACT

The invention relates to a directional coupling-type multi-drop bus of which the impedance is matched with the bus at the time of coupling so that the speed is increased. A directional coupler is formed when a second module provided with a second coupler end is mounted on a first module provided with a first coupler end, and as a result, the coupling impedance where the proximity effects in the coupling state of the directional coupler are reflected is matched with the impedance of the bus.

18 Claims, 20 Drawing Sheets

(56) References Cited

U.S. PATENT DOCUMENTS

| | | |
|---|---|---|
| 6,654,270 B2 | 11/2003 | Osaka et al. |
| 7,080,186 B2 | 7/2006 | Simon et al. |
| 7,475,179 B2 | 1/2009 | Osaka |

FOREIGN PATENT DOCUMENTS

| | | |
|---|---|---|
| WO | 02/060137 A1 | 8/2002 |
| WO | 2004/003718 A1 | 1/2004 |
| WO | 2004/003719 A1 | 1/2004 |

OTHER PUBLICATIONS

Takeya et al., "A 12Gb/s Non-Contact Interface with Coupled Transmission Lines", ISSCC Dig. Tech. Papers, IEEE International Solid-State Circuits Conference, Feb. 23, 2011, pp. 492-493.

Yun et al., "A 7Gb/s/Link Non-Contact Memory Module for Multi-Drop Bus System Using Energy-Equipartitioned Coupled Transmission Line", ISSCC Dig. Tech. Papers, IEEE International Solid-State Circuits Conference, Feb. 20, 2012, pp. 52-54.

International Search Report dated Apr. 23, 2013 issued in corresponding application No. PCT/JP2013/053012.

Written Opinion dated Apr. 23, 2013, issued in counterpart International PCT Application No. PCT/JP2013/053012, with English translation, (16 pages).

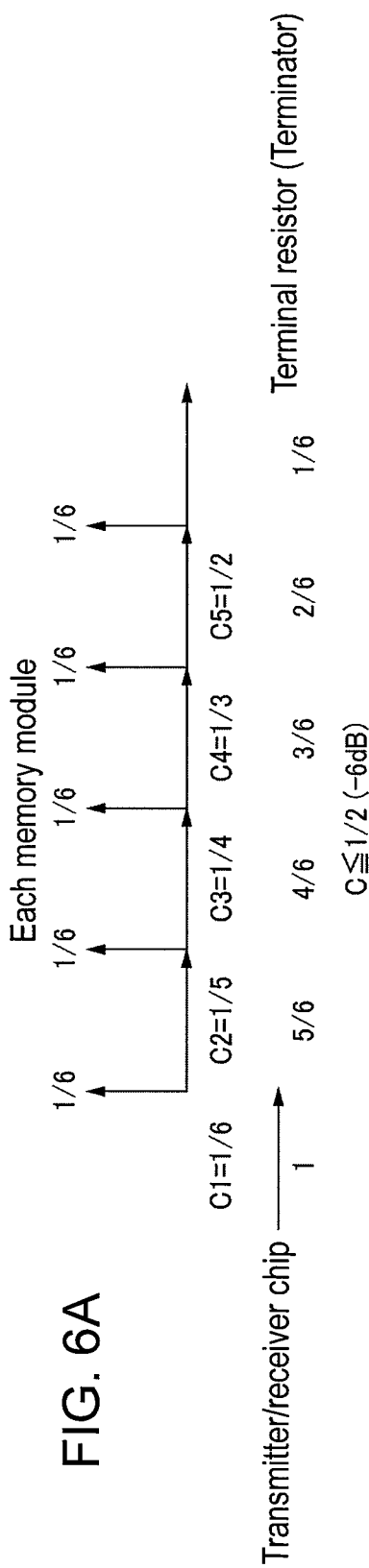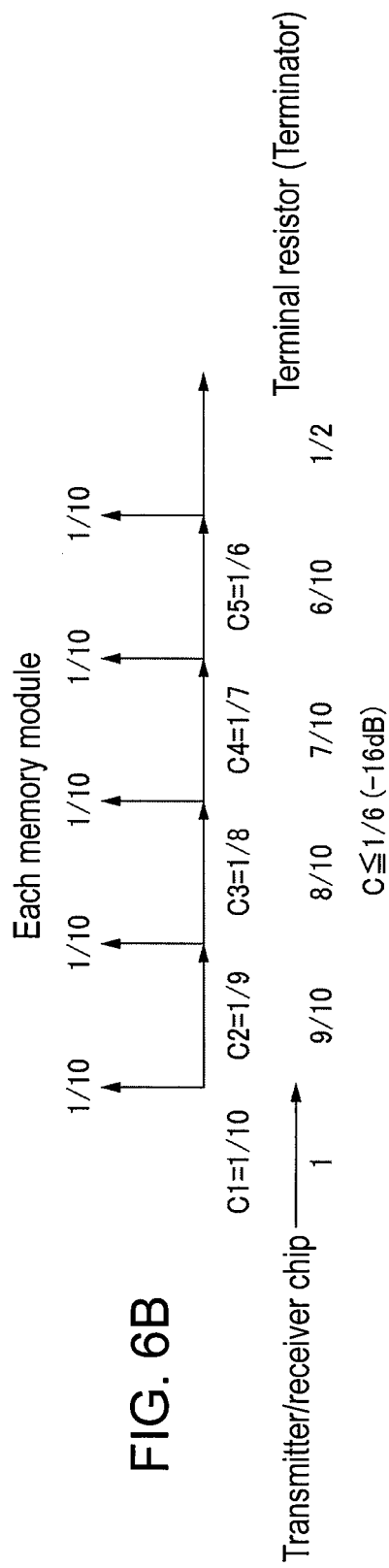

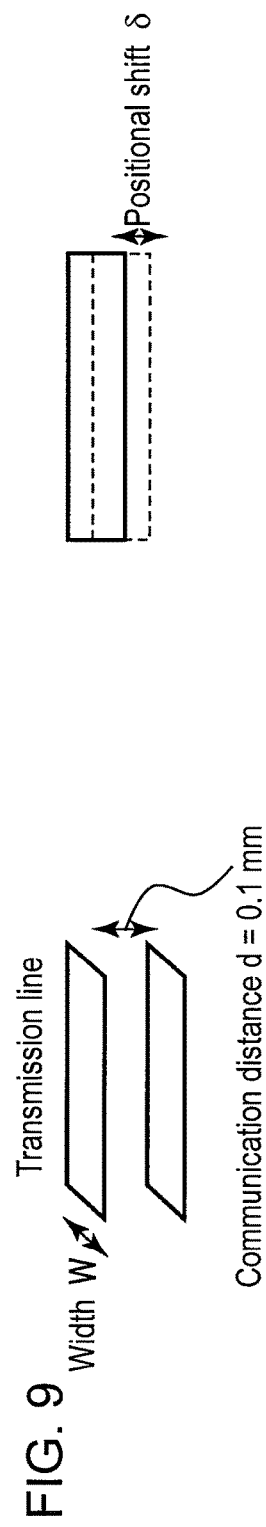

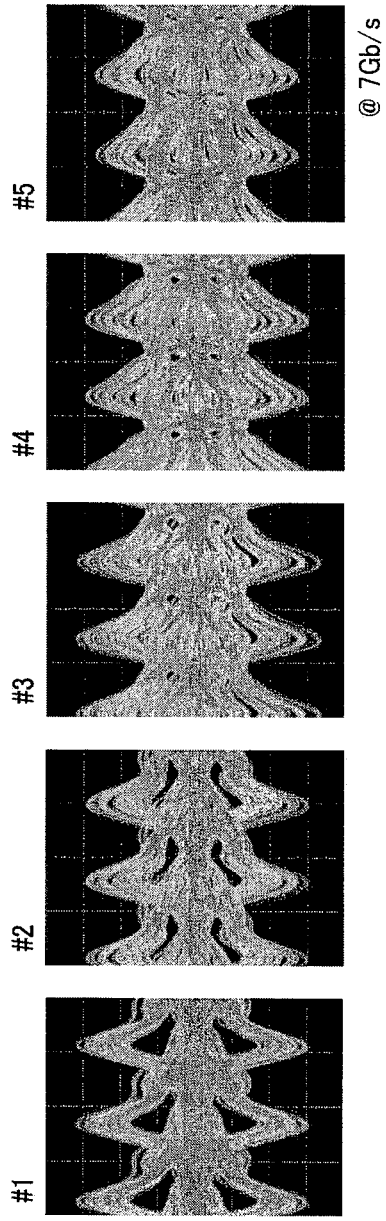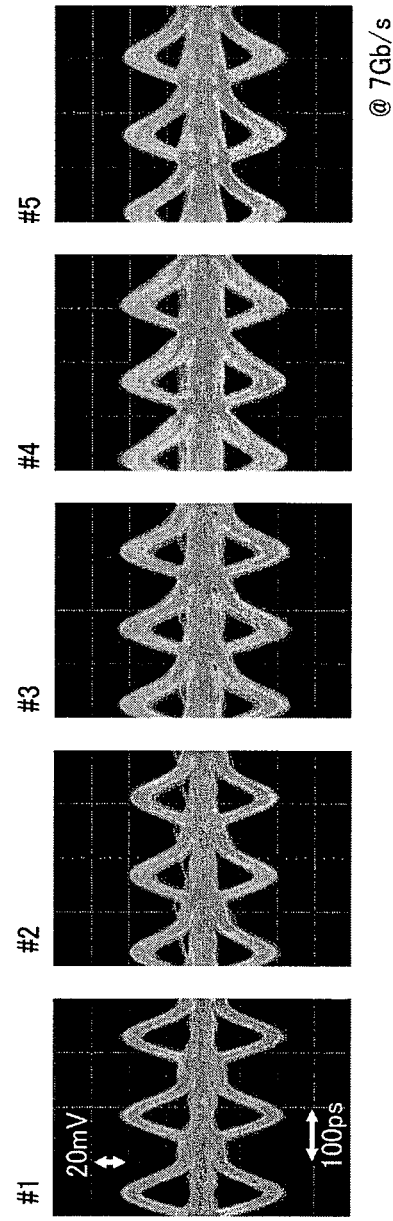
FIG. 15A
FIG. 15B

DIRECTIONAL COUPLING-TYPE MULTI-DROP BUS

CROSS-REFERENCE TO RELATED APPLICATIONS

This application is a continuation of International Application No. PCT/JP2013/053012, filed on Feb. 8, 2013, now pending, herein incorporated by reference. Further, this application is based upon and claims the benefit of priority from the prior Japanese Patent Application No. 2012-032711, filed on Feb. 17, 2012, entire contents of which are incorporated herein by reference.

TECHNICAL FIELD

The present invention relates to a directional coupling-type multi-drop bus, for example, a technology for signal transmission between modules such as processors and memories formed of CMOS integrated circuits, and in particular, to a multi-drop bus with increased speed where a number of modules are connected to the same transmission line for data transfer.

BACKGROUND ART

A multi-drop bus is a connection technology for mutual communication between a number of modules which share one transmission line (bus). In many cases, a processor and a memory module are connected through a multi-drop bus in a data processing device, for example. As compared to the connection technology for one-to-one communication using a number of dedicated transmission lines, a multi-drop bus has such an advantage that the number of transmission lines can be reduced.

A multi-drop bus, however, has such a disadvantage that the transfer speed cannot be increased because the characteristic impedance discontinues at the branch points of a transmission line. When the characteristic impedance discontinues, part of the signal is reflected, which causes distortion of the signal that has passed through. In addition, the input capacitance of the module attached to a small transmission line (stub) at the end of a branch lowers the impedance of the branch point, which causes signal distortion, and thus, further delays the signal propagation along the bus.

When a connector is inserted into a stub so that a module can be exchanged or added, a component of the capacitance or the inductance that is parasitic to the connector is added to the branch point, which causes the reflection or distortion of the signal that propagates along the bus. Furthermore, the reflection or distortion of the signal causes interference between symbols, which causes a bit error.

Thus, signal reflection or distortion is generated at each branch point in a multi-drop bus, and therefore, the transfer speed cannot be increased as compared to one-to-one communication. In many cases, however, the data transfer between a processor and a memory module determines the performance of the system, and thus, the demand on a multi-drop bus with increased speed is very high.

In order to solve such a problem, it has been proposed to branch the signal without greatly changing the impedance by using a directional coupler. In this case, the input capacitance of a module attached to a stub and the parasitic component of the connector can be separated from the bus, and therefore, there is such an advantage that no reflection or distortion is generated in the signal that propagates along the bus.

It has been proposed to form a multi-drop bus by using a directional coupler where two parallel lines formed as printed wires on the same board are sandwiched between two grounded conductive plates (see Patent Document 1). In this case, the impedance of the directional coupler is the same for all the directional couplers, which means a single impedance.

Alternatively, it has been proposed to form directional couplers either on the main board or a child board (see Patent Document 2). In the case where couplers are formed on the main board, the signal is discarded by the terminal resistor after being branched by a coupler even when no child board is mounted. In the case where couplers are formed on a child board, the bus formed on the child board allows the signal to repeatedly leave the main board through the connector, pass through a coupler on the child board, and return to the main board, and finally, the bus is provided with matched termination. Accordingly, such a problem arises that a connector is inserted into the bus and the signal along the bus is reflected and distorted by the parasitic effects of the connector.

It has also been proposed to apply a multi-drop bus using such directional couplers to a memory module (see Patent Document 3). In this case, the directional couplers are formed on the same board with a single impedance.

In order to solve the problem of impedance mismatch in such directional couplers, wave form shaping by using a reflected wave generated from the mismatch of the impedance has also been proposed (see Patent Document 4). In this case, the reflected wave is created on the transmission side so that distortion is added to the transmission signal, and as a result, reflection and distortion are offset in a coupled portion. In this proposal as well, the directional couplers are formed on the same board.

In addition, it has been proposed that each directional coupler have a different coupling degree in order to divide the signal so that the propagating signal amount to each module is approximately equal in the directional coupling-type bus system (see Patent Document 5). In this case as well, the directional couplers are formed on the same board with a single impedance.

Furthermore, it has been proposed to wire the bus on the mother board and the stubs on the memory modules in zigzag form so that two wires cross each other when projected so as to form a directional coupler when the memory modules are mounted on the mother board (see Patent Document 6 and Non-Patent Document 1). In this case, coupling is provided in a portion where two wires cross each other, and therefore, the crossing form is not different even when the two wires positionally shift slightly, and thus, there is such an advantage that the coupling characteristics do not change even when the position of the wires shifts. In this case as well, the directional couplers are formed with a single impedance.

PRIOR ART DOCUMENTS

Patent Documents

Patent Document 1: U.S. Pat. No. 3,619,504
Patent Document 2: Japanese Unexamined Patent Publication H07 (1995)-141079
Patent Document 3: Japanese Unexamined Patent Publication 2001-027987

Patent Document 4: International Unexamined Patent Publication WO2004/003718

Patent Document 5: International Unexamined Patent Publication WO2004/003719

Patent Document 6: International Unexamined Patent Publication WO2002/060137

Non-Patent Document

Non-Patent Document 1: John R. Benham, et al., "An Alignment Insensitive Separable Electromagnetic Coupler for High-Speed Digital Multidrop Bus Applications", IEEE Transactions on Microwave Theory and Techniques, Vol. 51, No. 12, December 2003

SUMMARY OF THE INVENTION

Problem to be Solved by the Invention

Coupling lines for directional couplers are not formed on the same circuit board, but rather coupler ends on the bus side are formed on the main board (mother board), and a coupler end on the stub side is formed on a child board (memory module) in the configuration so that a coupler is formed when the two boards are provided in proximity to each other, which makes non-contact data transfer possible. In this case, the memory modules can be connected or removed without being affected by the parasitic elements of the connectors.

In the case where the transmission lines of a coupler made up of a pair of transmission lines are formed on separate boards and the coupler is formed by providing the two boards in proximity to each other with the position being adjusted, however, the precision of the size of the coupler becomes poor due to an error in positioning, or a gusset, or excess play that is required in a mechanical structure for proximity arrangement, and as a result, such a problem arises that high-speed data transfer is difficult.

Meanwhile, it is requested in the above-described proposals in Patent Document 6 and Non-Patent Document 1 to set the coupling degree to a certain extent or greater in order for the couplers to propagate a signal with a sufficiently great power. Otherwise, the power required for communication increases such that the transmission power is increased or the received signal is amplified. Meanwhile, the stronger the coupling degree is, the greater the signal power is to propagate, which lowers the characteristic impedance in a coupled portion, and thus, increases the mismatch in the impedance in the border between the transmission lines in the coupled portion.

Accordingly, the mismatch in the characteristic impedance is desired to be reduced in order to increase the communication speed, and therefore, such a problem arises that the coupling degree cannot be made very high and either an increase in the communication speed or a reduction in the power is restricted. There are other problems such that the coupling area is small, the coupling degree is low, and the signal band is narrow when lines are crossed for coupling as compared to conventional couplers for coupling between parallel lines.

Furthermore, the distance between two lines becomes smaller or greater when differential transmission lines are wired in zigzag form. In the case where the distance becomes smaller, the characteristic impedance lowers due to the proximity effects. Thus, the characteristic impedance lowers when the distance between two lines is smaller while the characteristic impedance increases when the distance between two lines is greater, and there is a problem such that a mismatch in the impedance arises due to the zigzag form.

In the case where two lines are wired in zigzag form with enough distance in between to such an extent that no proximity effects are provided, a change in the impedance does not occur. However, the coupling between the two lines becomes weak, and therefore, the return current flows through the plane so as to easily affect the differential impedance, which makes it difficult to control the differential impedance, lowers the density of integration, and causes other problems.

Since the same couplers are aligned, the signal power is divided sequentially starting from the front relative to the direction in which the signal propagates when a number of memory modules are mounted, and thus, the signal power that propagates to a module located farther away gradually decreases. In the case where four memory modules are coupled with the same coupling degree $C=\frac{1}{5}$, for example, the signals transmitted from the memory controller propagate with the signal power ratio being:

$\frac{1}{5}=0.20$ to the first module, which is the closest;

$(1-\frac{1}{5})\times(\frac{1}{5})=\frac{4}{25}=0.16$ to the second module, which is the second closest;

$(\frac{4}{5}-\frac{4}{25})\times(\frac{1}{5})=\frac{16}{125}\approx 0.13$ to the third module; and $(\frac{16}{25}-\frac{16}{125})\times(\frac{1}{5})=\frac{64}{625}\approx 0.10$ to the fourth module, which is the farthest away, and thus, only approximately half the signal power of that to the first module reaches the fourth module.

Accordingly, power that is approximately two times greater than the necessary signal power reaches the first module that is the closest when the transmission power is set so that the necessary signal power reaches the fourth module that is the farthest, which wastes power.

Conversely, it is ideal for $\frac{1}{5}$ of the signal power to be divided to each module and for the last $\frac{1}{5}$ of the power to be discarded at the terminal resistor (terminator) of the bus. In order to do so, the coupling degree of the first module may be set to $C_1=\frac{1}{5}$, the coupling degree of the second module may be set to $C_2=(\frac{1}{5})/(\frac{4}{5})=\frac{1}{4}$, the coupling degree of the third module may be set to $C_3=(\frac{1}{5})/(\frac{3}{5})=\frac{1}{3}$, and the coupling degree of the fourth module may be set to $C_4=(\frac{1}{5})/(\frac{2}{5})=\frac{1}{2}$.

In the above-described proposals in Patent Document 6 and Non-Patent Document 1, however, the coupling degree and the impedance matching are not compatible since they are restricted to such a degree that they run counter to each other. That is to say, the mismatch in the impedance increases when the coupling degree is changed to a greater range, and therefore, it is difficult to change the coupling degree to a greater range.

Accordingly, an object of the present invention is to match the impedance with the bus at the time of coupling for increased speed in a multi-drop bus for branching a signal to a stub on a child board from the bus on the main board, where transmission lines formed on the main board and a child board, respectively, in such a state that the child board is placed on the main board are coupled to form a directional coupler.

Means for Solving Problem (1) In order to solve the above-described problems, the present invention provides a directional coupling-type multi-drop bus with: a first module having at least: n first coupler ends provided on a surface of a first board and aligned in such an order that the differential characteristic impedance is $Z_{ja}$ ($Z_{1a} \leq Z_{2a} \leq \ldots \leq Z_{na}$); a first semiconductor integrated circuit device having a transmitter/receiver circuit of which the differential input/output impedance is $Z_{0a}$ ($Z_{0a}<Z_{1a}$); a first terminal member of which the differential impedance is $Z_{0a}$; and a plane provided on a rear surface of the above-described first board, wherein the above-described first semiconductor integrated circuit device, the above-described n coupler ends, and the above-described first terminal member are linked together in this order with connection lines of which the differential characteristic impedance is $Z_{0a}$; and a second module having at least: a second coupler end of which the differential characteristic impedance is $Z_{1b}$; a second semiconductor integrated circuit device of which the differential input/output impedance is $Z_{0b}$ ($Z_{0b}<Z_{1b}$); and a second terminal member of which the differential impedance is $Z_{0b}$, and is characterized in that the above-described second semiconductor integrated circuit device, the second coupler end, and the above-described second terminal member are linked together in this order with connection lines of which the differential characteristic impedance is $Z_{0b}$, wherein the above-described second module is mounted on the above-described first module so that a first coupler end and the above-described second coupler end are aligned in proximity so as to face each other and form a directional coupler, and coupling impedances $Z_{ja\text{-}coupled}$ and $Z_{1b\text{-}coupled}$ which reflect the proximity effects in at least one coupling state of the above-described directional couplers are within a range of +/−5% of $Z_{0a}$ and within a range of +/−5% of $Z_{0b}$, respectively.

Thus, the differential characteristic impedance after coupling, that is to say, the coupling impedances $Z_{ja\text{-}coupled}$ and $Z_{1b\text{-}coupled}$, are made approximately equal to the differential characteristic impedances $Z_{0a}$ and $Z_{0b}$, respectively, of the connection lines, and therefore, the impedance can be matched when the second module is mounted, and as a result, it is possible to increase the speed of signal propagation.

(2) In addition, in the above (1), the present invention is characterized in that the coupling degree $C_j$ of the above-described directional couplers is $C_1 \leq C_2 \leq \ldots \leq C_n$ (here, $C_1 < C_n$). The farther away the signal is from the first semiconductor integrated circuit device, the greater the number of branches by which the signal attenuates is, and therefore, it is desirable that the farther away a directional coupler is from the first semiconductor integrated circuit device, the greater the coupling degree $C_j$ of the directional coupler is.

(3) Furthermore, in the above (1) or (2), the present invention is characterized in that the distance between differential lines in a first coupler end is the same or greater than the distance to the above-described plane. Thus, the distance between differential lines can be made equal to or greater than the distance to the above-described plane so that the coupling between the differential lines can be made weaker and the adjustment of the differential characteristic impedance $Z_{ja}$ can be made easier.

(4) Moreover, in the above (1) to (3), the present invention is characterized in that the differential characteristic impedance $Z_{ja}$ of the above-described first coupler ends is adjusted by the line width of the differential lines of the above-described first coupler ends. Thus, the differential characteristic impedance $Z_{ja}$ of the first coupler ends can be adjusted by the line width of the differential lines, and the line width Wj is desirably adjusted to $W_1 \geq W_2 \geq \ldots \geq W_n$.

(5) In addition, in the above (1) to (4), the present invention is characterized in that the greater the coupling degree C of the above-described directional couplers is, the higher the differential characteristic impedance $Z_{ja}$ of the above-described first coupler ends before coupling is than the differential characteristic impedance $Z_{0a}$ of the above-described connection lines. As a result of this setting, the impedance can be matched in the coupling state of all the directional couplers.

(6) Furthermore, in the above (5), the present invention is characterized in that the coupling degree of each of the above-described directional couplers is set higher as the directional coupler is farther away from the above-described first semiconductor integrated circuit device, and at the same time, the farther away a first coupler end is from the above-described first semiconductor integrated circuit device, the narrower the line width of the differential lines in the above-described first coupler end is. Thus, the narrower the line width of the differential lines is, the higher the differential characteristic impedance is.

(7) Moreover, in the above (2) to (6), the present invention is characterized in that the coupling degree of each of the above-described directional couplers is set so as to divide the signal power equally by changing the distance d between the first coupler end and the second coupler end. Thus, the coupling degree is set so that the signal power can be divided equally, and as a result, such a state where the waveform of the received signal can be determined in the second module mounted on a location away from the first semiconductor integrated circuit device can be gained with low power consumption.

(8) In addition, in the above (2) or (7), the present invention is characterized in that the distance d between a first coupler end and the second coupler end is adjusted by the thickness of the insulating film provided between the first coupler end and the second coupler end. Thus, the coupling degree can be adjusted by the thickness of the insulating film provided between the first coupler end and the second coupler end.

(9) Furthermore, in the above (2) or (7), the present invention is characterized in that the distance d between a first coupler end and the second coupler end is adjusted by the level of the layer of the multilayer wires provided on the above-described first board. Thus, the coupling degree can also be adjusted by the multilayer wiring structure provided on the first board.

(10) Moreover, in the above (2) or (7), the present invention is characterized in that the farther away a first coupler end is from the above-described first semiconductor integrated circuit device, the shorter the distance between differential lines in the first coupler end is. Thus, the coupling degree can be adjusted by the distance between the differential lines.

(11) In addition, in the above (1) to (10), the present invention is characterized in that the line width of differential lines in a first coupler end is wider than the positional error of the above-described second module relative to the above-described first module. Thus, as a result of this setting, a dramatic reduction in the coupling degree due to the positional error can be avoided.

(12) Furthermore, in the above (11), the present invention is characterized in that the shape of the above-described directional couplers is rectangular. Thus, the shape of the directional couplers is rectangular so that the coupling in the direction of the diagonal lines due to the positional shift when a second module is mounted on the first module can be reduced.

(13) Moreover, in the above (1) to (12), the present invention is characterized in that a terminal module where terminal resistors are connected to both ends of the above-described second coupler end is mounted on a first connector end on which the above-described second module is not mounted. Thus, the terminal module can be used so that the impedance mismatch can be avoided in the case where the number of required second modules is small.

(14) In addition, in the above (1) to (12), the present invention is characterized in that the plane provided on the rear surface of the above-described first board provides a missing portion in the location facing a first coupler end, and a plane module where a plane is provided instead of the above-described second coupler end is mounted on a first connector end on which the above-described second module is not mounted. In the case where the missing portions of the plane are thus provided on the first board, the impedance mismatch can be avoided by using a plane module in the case where the number of required second modules is small.

(15) Furthermore, in the above (1) to (14), the present invention is characterized in that a number of modules that are the same as the second module to be mounted on the above-described first module all have the same characteristics and structure. Thus, impedance matching or a coupling degree adjusting means is provided on the first module side so that the second module can be used for various purposes, and a memory system using a directional coupling-type multi-drop bus can be implemented at a low cost.

Effects of the Invention

The disclosed directional coupling-type multi-drop bus makes it possible to match the impedance of the bus at the time of coupling, and as a result, the speed of signal transfer can be increased. Moreover, a structure where the signal power is equally divided into the child boards or a structure where the performance of the coupler can be maintained approximately constant even when a child board is positionally shifted to a certain extent relative to the main board can be used together with the present invention so that not only an increase in the speed, but also a reduction in the power and an increase in the reliability can be realized at the same time.

BRIEF DESCRIPTION OF THE DRAWINGS

FIGS. 6A and 6B are diagrams showing the relationship between the degree of coupling in directional couplers and the power of a propagating signal;

FIGS. 8A and 8B are diagrams showing the coupling impedance matching in Example 1 of the present invention;

FIG. 9 is a diagram showing the positional shift of the directional coupler according to Example 1 of the present invention;

FIGS. 15A and 15B are waveform diagrams showing the waveforms of the received signal measured in a child board;

PREFERRED EMBODIMENTS OF THE INVENTION

Figure 1:
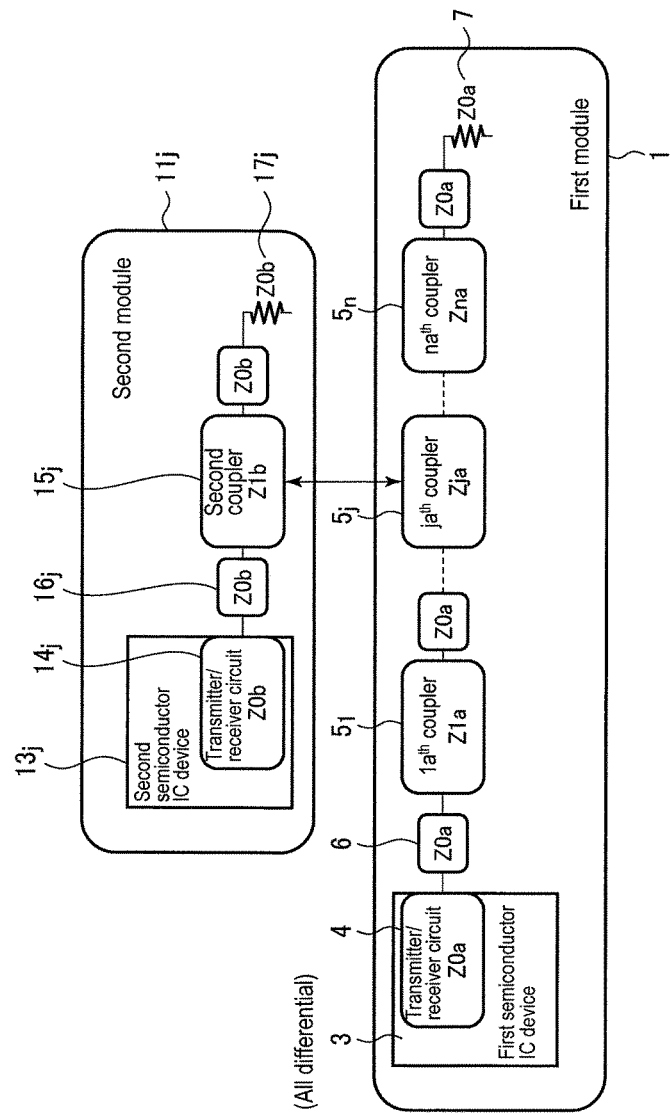
FIG. 1 is a schematic block diagram showing the directional coupling-type multi-drop bus according to an embodiment of the present invention.

In reference to FIG. 1, the directional coupling-type multi-drop bus according to an embodiment of the present invention is described below. FIG. 1 is a schematic block diagram showing the directional coupling-type multi-drop bus according to an embodiment of the present invention. A first module 1 formed on a main board is provided with a number of first couplers $5_1$ to $5_n$, where each of these first coupler ends $5_j$ is directionally coupled with a second coupler end $15_j$ formed on a second module $11_j$ that becomes a child board $12_j$. The symbols 6, 7, $13_j$, $14_j$, $16_j$, $17_j$, $18_j$, and $19_j$ in the figure are a connection line, a terminal resistor (terminator), a second semiconductor integrated circuit device, a transmitter/receiver circuit, a stub, a terminal resistor (terminator), a via wire, and a DRAM, respectively.

Here, the differential impedance $Z_c$ of each directional coupler is set slightly higher than the characteristic impedance Z of the bus in advance ($Z_c > Z$) in accordance with the degree of coupling so that the differential impedance matches at the time of coupling ($Z_{c\text{-}coupled} = Z$). Accordingly, the greater the degree of coupling C in a coupler is, the higher the differential impedance $Z_c$ of the coupler before coupling needs to be set as compared to the characteristic impedance Z of the bus. Here, the matching of the coupling impedance is allowed to have an error in a range of +/−5%, judging from the results of the below-described electrical field simulation.

Thus, the means for adjusting the differential impedance $Z_c$ include:

a. Means for widening the distance $S_c$ between the differential lines in the coupler so that the coupling between the differential lines is weakened, and therefore, determining the impedance with the line width $W_c$; or b. Means for keeping the differential lines of the coupler away from each other so that the distance $S_c$ becomes equal to or greater than the distance h to the plane (almost equal to the thickness of the board) with the coupling between the differential lines becoming weaker, and therefore, determining the differential impedance with the line width $W_c$, in such a state that the distance between the lines, the bus and the stub $16_j$, is sufficiently large enough to prevent coupling.

In addition, it is desirable that the farther away a coupler is from the transmitter/receiver circuit 4, the greater the degree of coupling $C_j$ is set. That is to say, the setting satisfies the following:

$$C_1 \leq C_2 \leq \ldots \leq C_n, \text{ where, } C_1 < C_n$$

In this case, the differential impedance is adjusted so as to satisfy the following in order to match the impedance in at least one directional coupler in the state where the second module is mounted:

$$Z < Z_{c1} \leq Z_{c2} \ldots \leq Z_{cn}$$

In this case, all the degrees of coupling may be set differently, or the degree of coupling of a number of couplers adjacent to each other may be set the same. In particular, the degree of coupling $C_j$ of each coupler can be adjusted so that the signal power is divided equally.

The degree of coupling $C_j$ is adjusted by varying the distance d between the first coupler end $5_j$ and the second coupler end $15_j$. The farther away a coupler is from the first semiconductor integrated circuit device 3 having a transmitter/receiver circuit 4, the thinner the insulating film between the first coupler end $5_j$ and the second coupler end $15_j$ is made, and thereby, the shorter the distance d is and the stronger the degree of coupling is.

Alternatively, the bus provided on the main board may have a multilayer wiring structure so that the distance can be adjusted by the level of the layer of the multilayer wires in a location where the first coupler end $5_j$ is provided. Here, the degree of coupling may be weakened by widening the distance between couplers on the main board, which has such a disadvantage as to be affected by the adjustment precision.

A coupler of which the line width $W_c$ (>δ) is greater than the positional error δ of the child board relative to the main board is used. For example, the coupler is made rectangular and the line width $W_c$ is greater than the assumed value δ of the error in the mounting position. That is to say, the coupling in the direction of the diagonal lines due to the positional shift when the second module $11_j$ is mounted on the first module 1 can be reduced when a rectangular coupler is used.

In the case where the impedance matches at the time of coupling when the second module $11_j$ is mounted, such a problem arises that the impedance does not match when the second module $11_j$ is not mounted. Therefore, it is desirable to match the impedance by mounting a child board for a terminal that does not have a memory or a transmitter/receiver circuit and only has a coupler and a terminal in portions on which a second module $11_j$ is not mounted. Alternatively, the plane on the main board is removed only from the coupling portions so that when a child board having a plane is mounted, the plane may be used as the plane of the bus coupler. Though the plane on the main board may be used as it is, the speed is slightly hindered from increasing due to the mismatch of the impedance.

According to the embodiment of the present invention, the impedance matches in at least one branch point of the bus, and therefore, an increase in the communication speed can be realized. In addition, the present invention can allow the signal power to be divided equally to the child boards, and thus, the power for communication can be reduced. Non-contact data transfer is also possible between the main board and a child board in such a manner that the transfer performance can be maintained even in the case where the two are slighted shifted positionally from each other, and therefore, the reliability in communication can be increased.

As for the concrete materials, a typical example of the circuit boards for forming the main board and child boards is an FR-4 base having a thickness of 0.5 mm and a relative dielectric constant of 4.2, on the two sides of which a copper foil having a thickness of 0.036 mm is printed, and the top of which is coated with an organic insulating film such as of a solder resist having a thickness of 0.05 mm and a relative dielectric constant of 4.2. Here, the present invention is applicable in the same manner even in the case where the thickness, the relative dielectric constant, or the number of layers of wires is different, or a board is of another type.

Though it is typical for the couplers and the connection lines to be made of a microstrip line having a plane directly below it, the invention can be implemented using microstrip lines when the plane is removed from between the lines only in the coupling portions. Though it is general for the differential impedance for the differential lines to be 100Ω when the characteristic impedance of the transmission line is 50Ω, which is typical, they may have other values. The number of modules to be mounted may be any number.

When an impedance matching means or a degree of coupling adjusting means is provided on the first module side, a second module $11_j$ can be used for many purposes, and thus, a memory system using a directional coupling-type multi-drop bus can be implemented at a low cost. Though the line width of the couplers on the second module side may be made the same as on the main board side, the second module $11_j$ does not have many purposes, and it becomes difficult to lower the cost.

Example 1

Based on the above, next, the directional coupling-type multi-drop bus according to Example 1 of the present invention is described in reference to FIGS. 2 to 15B. Here, the degree of coupling is adjusted by the thickness of the insulating film, and at the same time, the distance between coupler lines $S_c$>the distance to the plane h and the constant coupler line width $W_c$>positional error δ are satisfied.

Figure 2:
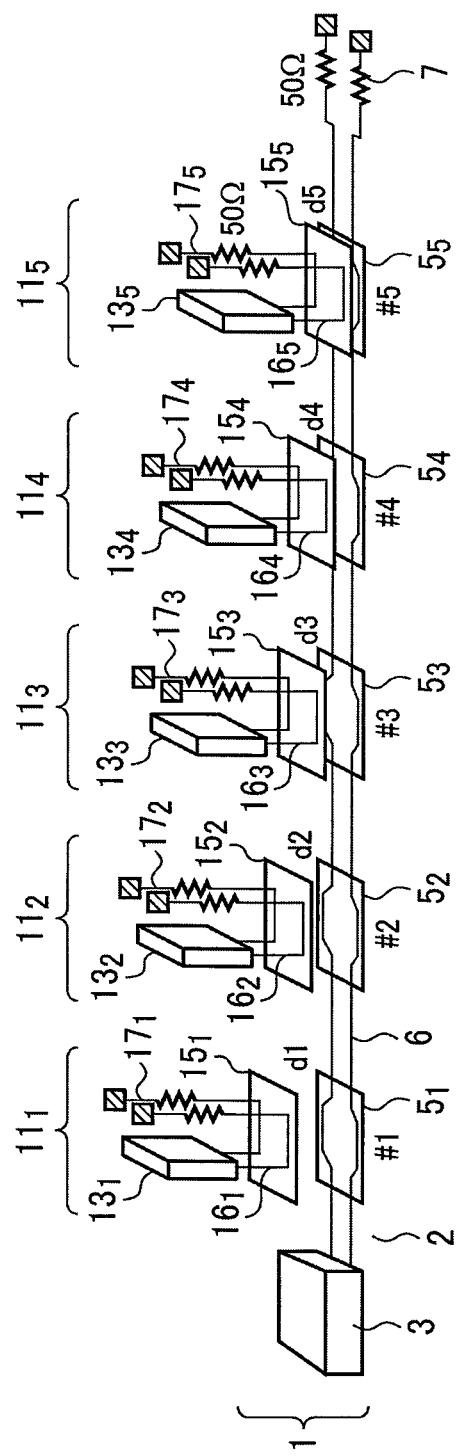
FIG. 2 is a schematic perspective diagram showing the directional coupling-type multi-drop bus according to Example 1 of the present invention.
Figure 3A:
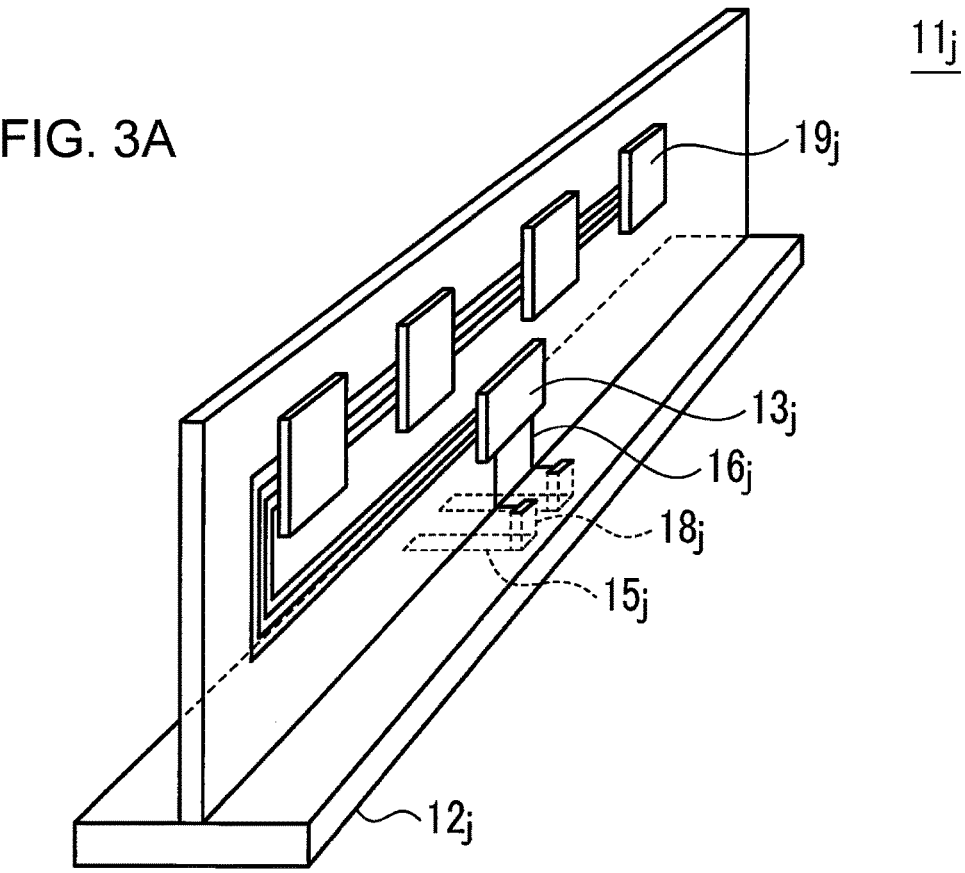
FIGS. 3A and 3B are schematic perspective diagrams showing a child board and a coupling portion in the directional coupling-type multi-drop bus according to Example 1 of the present invention.
Figure 3B:
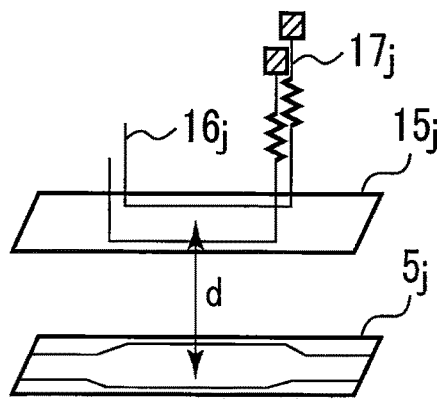

FIG. 2 is a schematic perspective diagram showing the directional coupling-type multi-drop bus according to Example 1 of the present invention. FIG. 3A is a schematic perspective diagram showing a child board, and FIG. 3B is a schematic perspective diagram showing a coupling portion. As shown in FIG. 2, bus lines (connection lines 6) are formed on a main board 2 of a number of pairs (only one pair is shown in the figure) of differential lines with a differential impedance Z (typically, 100Ω) that are wired parallel to each other from a first semiconductor integrated circuit device 3, which is a transmitter/receiver chip such as a microprocessor having a transmitter/receiver circuit 4. Though in FIG. 2 the differential lines are straight lines in the layout, they may be curved.

The bus lines are terminated through matching at the connection points with the transmitter/receiver chip and at the terminal points while a first coupler end $5_j$ for branching a signal is inserted into a stub along a differential line, and a second module $11_j$ such as a memory module formed of a child board is mounted on this first coupler end Though in FIG. 2 the first coupler end $5_j$ is inserted in five places from #1 to #5, the number thereof may be any number. A second coupler end $15_j$ on the child board side is formed of a transmission line at the bottom of a memory module so as to face the first coupler end $5_j$ on the main board 2 in close proximity, and thus, a directional coupler is formed.

As shown in FIG. 3A, the two ends of the second coupler end $15_j$ on the memory module side are wired above the memory module through via wires $18_j$. The second coupler end $15_j$ on the memory module side is terminated through matching in the forward direction relative to the flow of the signal on the main board and is connected to the second semiconductor integrated circuit device $13_j$, which is a transmitter/receiver chip, through differential lines in the reverse direction. Here, the first coupler end $5_j$ on the main board side and the second coupler end $15_j$ on the child board side face each other at a close distance for capacitive/inductive coupling. However, the distance between other parts of the lines is great, and therefore, there is no coupling.

In this case, a mechanical structure such as of a conventional connector can be used to mount the memory module, and the contact of wires in the connector allows power to be supplied to the memory module as in the prior art. Data is transferred in a non-contact manner through the directional coupler.

Figure 4:
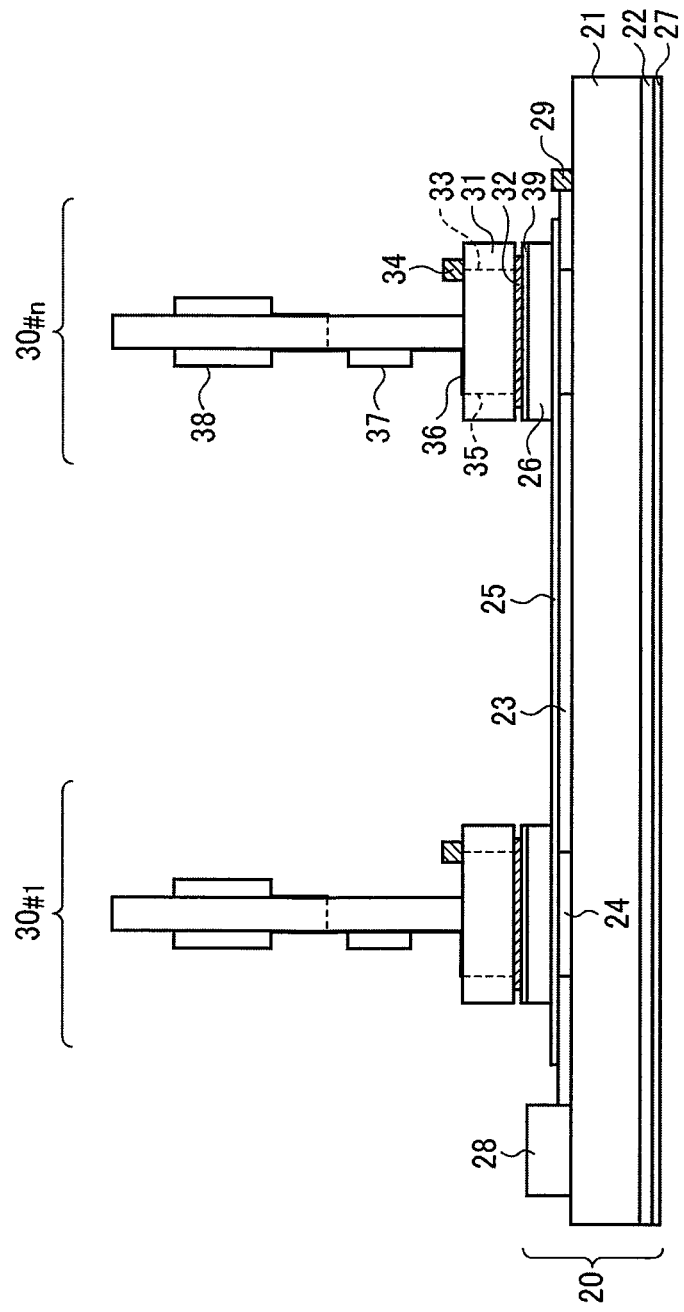
FIG. 4 is a cross-sectional diagram showing the directional coupling-type multi-drop bus according to Example 1 of the present invention.

As shown in FIG. 3B, the shorter the distance d between the first connector end $5_j$ on the main board side and the second connector end $15_j$ on the child board side is, the stronger the degree of coupling C of the directional coupler can be made. Here, the closer the coupler is to the transmitter/receiver chip on the main board, the greater the distance d is made so that the degree of coupling C is weaker, while the farther away the coupler is, the shorter the distance d is made so that the degree of coupling C is stronger. The distance to the closest coupler #1 is denoted by $d_1$ with the degree of coupling thereof being denoted by $C_1$, while the distance to the next closest coupler #2 is denoted by $d_2$ with the degree of coupling thereof being denoted by $C_2$. When the distance to the coupler and the degree of coupling thereof are denoted in the same way sequentially, the following relationships are satisfied:

$C_1 \leq C_2 \leq C_3 \leq C_4 \leq C_5$, where $C_1 < C_5$, and $d_1 \geq d_2 \geq d_3 \geq d_4 \geq d_5$, where $d_1 > d_5$ FIG. 4 is a cross-sectional diagram showing the directional coupling-type multi-drop bus according to Example 1 of the present invention. A plane 22 connected to the ground is provided on the rear surface of a board 21 made of an FR-4 base having a thickness of 0.5 mm and a relative dielectric constant of 4.2. A copper foil having a thickness of 0.036 mm is patterned so that differential lines 23 and coupler ends 24 are formed of microstrip lines on the front surface of the board 21. The top thereof is covered with an organic insulating film 25 made of a solder resist having a thickness of 0.05 mm and a relative dielectric constant of 4.2, and furthermore, an organic insulating film 26 having a thickness of $t_j$ is provided above the coupler ends 24. Here, an organic insulating film 27 made of a solder resist having a thickness of 0.05 mm and a relative dielectric constant of 4.2 is provided on the surface of the plane 22. In addition, a transmitter/receiver chip 28 such as a microprocessor having a transmitter/receiver circuit is connected to one end of the differential lines 23, while a terminal resistor 29 is connected to the other end so that the differential impedance becomes 100Ω.

Meanwhile, a memory module 30 is provided with a coupler end 32 on the rear surface of the child board 31 in an inverted T shape, where one of the two ends of this coupler end 32 is connected to the terminal resistor 34 through a via wire 33 while the other is connected to a stub 36 through a via wire 35. This stub 36 is connected to a transmitter/receiver chip 37, and a number of DRAMs 38 are connected to this transmitter/receiver chip 37. In addition, an organic insulating film 39 made of a solder resist having a thickness of 0.05 mm and a relative dielectric constant of 4.2 is provided on the surface of the coupler end 32.

When a memory module 30 is mounted on a piece of the organic insulating film 26, the distance between the memory module 30 and the coupler end 24 on the main board 20 is the sum of the thickness $t_j$ of the organic insulating film 26 and the thickness of the two solder resist films (organic insulating film 25+organic insulating film 39) so that $d_j = t_j + 0.100$ mm.

The distance $d_j$ of each coupler is adjusted by varying the thickness $t_j$ of the organic insulating film 26 provided in the location of each memory module 30. When $t_1 = 0.100$ mm, $t_2 = 0.075$ mm, $t_3 = 0.050$ mm, $t_4 = 0.025$ mm, and $t_5 = 0$ mm, then $d_1 = 0.200$ mm, $d_2 = 0.175$ mm, $d_3 = 0.150$ mm, $d_4 = 0.125$ mm, and $d_5 = 0.100$ mm. In this case, the organic insulating film 26 may be made of insulating films, each of which has a thickness of 0.025 mm, and the thickness of the organic insulating film 26 may be adjusted by changing the number of layered insulating films.

Thus, the organic insulating film 26 having a different thickness depending on the coupler end 22 on the main board 20 is formed so that the degree of coupling with each memory module 30 can be varied even in the case where the same memory modules 30 are mounted, and thus, it is possible to use the memory modules 30 for many purposes. For the mounting of the memory modules 30, connectors may be used or other engaging mechanisms may be used.

Figure 5A:
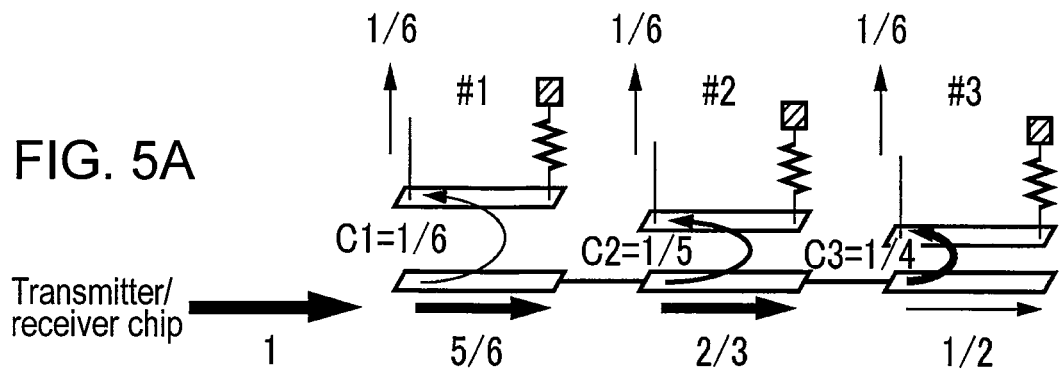
FIGS. 5A to 5C are diagrams showing the signal propagation and signal power at the time of writing in and reading out of memories using the directional coupling-type multi-drop bus according to Example 1 of the present invention.
Figure 5B:
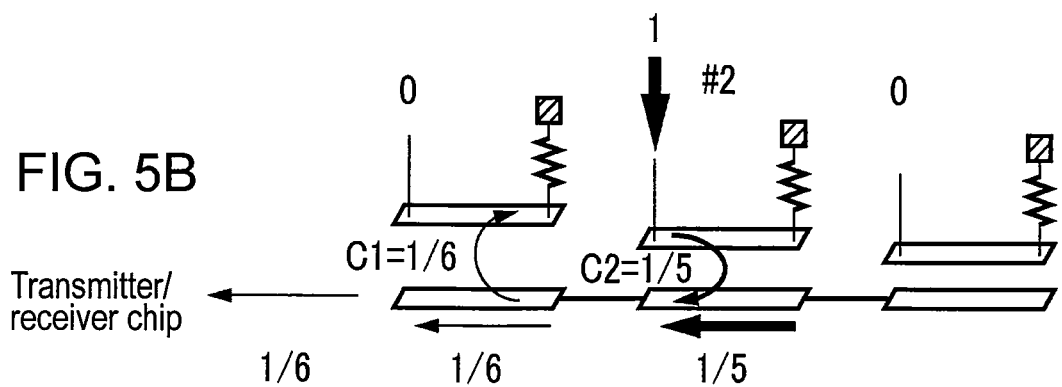
Figure 5C:
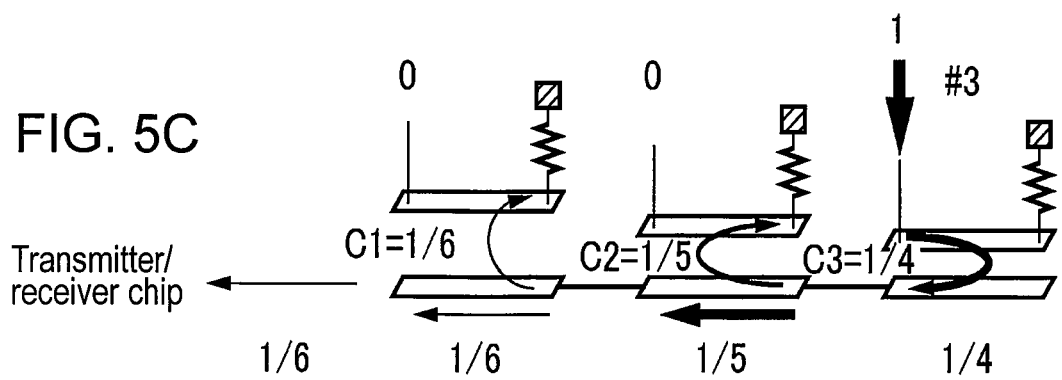

FIGS. 5A to 5C are diagrams showing the signal propagation and signal power at the time of writing in and reading out of memories using the directional coupling-type multi-drop bus according to Example 1 of the present invention. As shown in FIG. 5A, the differential signal transmitted from the transmitter/receiver chip on the main board propagates through the differential lines from the left to the right in the figure, and part of the signal in response to the degree of coupling in the first directional coupler propagates in the reverse direction to the second memory module #2, and thus, propagates through the coupler end of the memory module #1 from the right to the left in the figure so as to move upwards through the child board through the via wires and the differential lines and is received by the transmitter/receiver chip. The signal that has passed through the coupling end on the main board from the left to the right in the figure without undergoing coupling in the first directional coupler further propagates through the differential lines so as to reach the second directional coupler, and after that repeats the same process, and finally is terminated through matching in the terminal resistor (terminator) provided in the terminal (right end in the figure) where the signal is not reflected.

As a result, data from the transmitter/receiver chip can be written into memory modules #1 to #3. In the figure, the degree of coupling $C_j$ in #1, #2, and #3 is $C_1=⅙$, $C_2=⅕$, and $C_3=¼$, respectively, and therefore, such a manner that the equally divided signal power, which is ⅙ of the transmission power, is delivered to each memory module #1 to #3 is shown.

At the time of reading out, the flow of the signal is opposite to the above. As shown in FIG. 5B, for example, as for the signal transmitted from the transmitter/receiver chip in the second memory module #2, part of the signal in response to the degree of coupling in the directional coupler propagates in the reverse direction to the main board while the remaining part of the signal that has not been coupled propagates through the coupler end of the second memory module #2 from the left to the right in the figure so as to be terminated through matching. The signal that has propagated to the main board propagates through the coupler end of the second directional coupler #2 from the right to the left in the figure so as to reach the first directional coupler #1. Part of the signal in response to the degree of coupling of the first directional coupler #1 propagates in the reverse direction to the first memory module #1 and propagates through the coupler end of the first memory module #1 from the left to the right in the figure so as to be terminated through matching. The remaining part of the signal that has not been coupled passes through the coupler end of the first directional coupler #1 on the main board from the right to the left in the figure, and thus, the signal power that is ⅙ of the power of the transmission signal is received by the transmission/reception chip on the main board side.

FIG. 5C shows the manner how the signal transmitted from the transmitter/receiver chip of the third memory module #3 is received by the transmitter/receiver chip on the main board side. The signal power received by the transmitter/receiver chip is ⅙ of the transmitted power in the same manner as in the case of FIG. 5B. Thus, no matter which memory module the signal is transmitted from, ⅙ of the signal power is received by the transmitter/receiver chip on the main board.

Though in reality there is a slight signal of which the direction of propagation is in the forward direction after coupling, the signal that has coupled in the forward direction is terminated afterwards through matching and is not reflected. The signal that has propagated in the forward direction to the memory module #1 in FIG. 5A, for example, is terminated through matching in the terminal resistor (terminator) that is located in a place to which the signal propagates afterwards. Alternatively, the signal that has propagated from the memory module #2 to the main board in the forward direction in FIG. 5B propagates to the memory module #3 in the reverse direction in the coupler #3, and after that is terminated through matching at the input for the reception by this transmitter/receiver chip.

FIGS. 6A and 6B are diagrams showing the relationship between the degree of coupling in directional couplers and the power of a propagating signal. As shown in FIG. 6A, in the case where the maximum degree of coupling is $C=½(-6$ dB), the degree of coupling of each coupler can be set to $C_1=⅙$, $C_2=⅕$, $C_3=¼$, $C_4=⅓$, and $C_5=½$ so that the power of the propagating signal can be equally divided to the respective memory module with the divided power being ⅙ of the transmitted power.

In the case where the degree of coupling of the coupler cannot be made as great as $C=½$, for example, in the case where the degree of coupling can be made $C=⅙$ (−16 dB) or less, as shown in FIG. 6B, the degree of coupling of each coupler can be set to $C_1=1/10$, $C_2=⅑$, $C_3=⅛$, $C_4=1/7$, and $C_5=⅙$ so that the power of the propagating signal can be equally divided to the respective memory module with the divided power being $1/10$ of the transmitted power.

Figure 7:
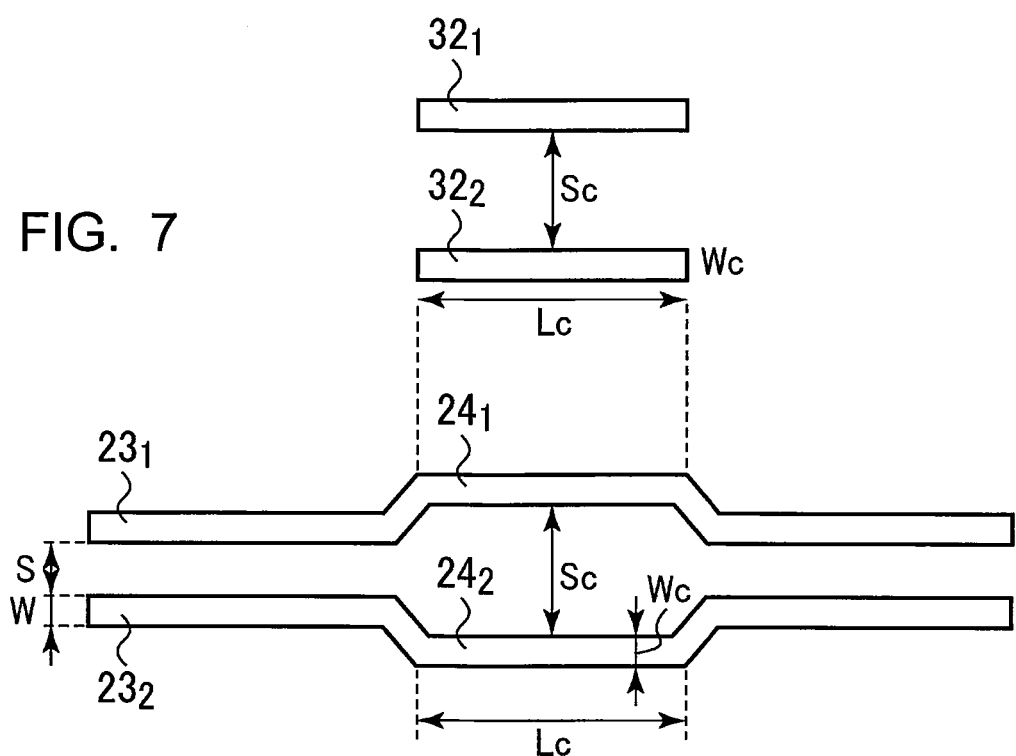
FIG. 7 is a plan diagram showing the directional coupler according to Example 1 of the present invention.

FIG. 7 is a plan diagram showing a directional coupler according to Example 1 of the present invention. It is desirable for the distance S between lines $23_1$ and $23_2$ of the differential lines 23 of the bus on the main board to be smaller than the distance h between the lines and the plane, that is to say, $S≤h$ is desirable. In the case where this condition is satisfied, one of the differential lines allows a return current for the other to flow through. That is to say, the lines $23_1$ and $23_2$ are in close proximity so as to be strongly and closely coupled.

In this case, the return current flows through the line $23_1$ or $23_2$ instead of the plane, and therefore, the differential impedance Z is determined mainly by the distance S between the lines $23_1$ and $23_2$ and the distance h without being affected by the distance vis-à-vis the plane, for example, which is desirable for matching, by controlling the impedance. The differential impedance Z of the lines $23_1$ and $23_2$ is typically designed so as to be 100Ω. A 50Ω resistor is inserted between each line and the terminal power source for termination through matching.

It is desirable for the distance $S_c$ between the lines $24_1$ and $24_2$ of the coupler ends 24 formed of the differential lines in a directional coupler to be greater than the distance h between the lines and the plane, that is to say, $S_c≥h$ is desirable. This is because the impedance of the coupler can be designed with a good perspective as described below without being affected by the coupling between the lines in the case where the coupling is weak between the lines $24_1$ and $24_2$ that form the coupler end.

Furthermore, the setting of $S_c≥h$ makes it possible for the coupling in the direction of the diagonal lines between the lines $24_1$ and $24_2$ and the lines $32_1$ and $32_2$ to be smaller due to the positional shift when a child board is mounted on the main board, and thus can reduce the effects thereof. That is to say, the return currents through the line $24_1$ and the line $24_2$ flow separately through the plane when the coupling between the line $24_1$ and the line $24_2$ is weak.

When the coupling between the differential lines is weak, the differential impedance is high and becomes close to two times greater than the characteristic impedance of each line. Accordingly, the differential impedance $Z_c$ of the line $24_1$ and the line $24_2$ is higher than the differential impedance Z of the line $23_1$ and the line $23_2$ that form differential lines in the state where the main board and the child board are not coupled to each other, that is to say, $Z_c>Z$ is satisfied.

When a child board is mounted on the main board so that the line $24_1$ and the line $23_1$ are in close proximity so as to be coupled to each other and the line $23_2$ and the line $32_2$ are in close proximity so as to be coupled to each other, the differential impedance $Z_c$ of the line $24_1$ and the line $24_2$ lowers so as to be equal to the differential impedance Z of the line $23_1$ and the line $23_2$, that is to say, $Z_{c\text{-}coupled}=Z$ is satisfied.

Here, the line width of the bus W=0.4 mm, the distance between the differential lines of the bus S=0.26 mm, the line width of a coupler $W_c$=0.4 mm, the distance between the lines of a coupler $S_c$=1.06 mm, the length of a coupler $L_c$=5 mm, and the distance between the lines and the plane h=0.5 mm are adopted as typical dimensions.

FIGS. 8A and 8B are diagrams showing the coupling impedance matching in Example 1 of the present invention, where FIG. 8A shows the results of electrical field simulation of the coupling impedance in conventional differential lines and FIG. 8B shows the results of electrical field simulation of the coupling impedance in Example 1 of the present invention. As shown in FIG. 8A, in the case of conventional differential lines, the coupling impedance lowers in accordance with the degree of coupling, causing mismatch of 20% or more. Meanwhile, as shown in FIG. 8B, the width of the lines in the directional couplers is widened to increase the impedance in Example 1 of the present invention, where the coupling impedance mismatch is less and the coupling impedance of at least one directional coupler can be matched. In addition, the coupling impedance mismatch in the third directional coupler is approximately 4%, and the mismatch can be within a range of approximately +/−10% as a whole.

Furthermore, the width $W_c$ of the lines of a coupler end is greater than the positional shift $\delta$ when a child board is mounted on the main board, that is to say, $W_c > \delta$ is satisfied in order for the system not to be affected by the positional shift. FIG. 9 is a diagram showing the positional shift in a directional coupler where the positional shift between the line of the coupler end 24 and the line of the coupler end 32 in the projection is defined as $\delta$.

The frequency $f_0$ at which the degree of coupling C of a directional coupler becomes maximum can be represented by the following in the case where the wavelength of the signal is $\lambda$:

$$f_0 = \lambda/4$$

The ¼ wavelength becomes 5 mm in a dielectric substance of which the relative dielectric constant is 4 when the frequency is approximately 7 GHz. Accordingly, $f_0$ is approximately 7 GHz when the length $L_c$ of the transmission line coupler is 5 mm, and $f_0$ is approximately 5 GHz when $L_c$ is 7 mm.

When the frequencies at which the degree of coupling C is 3 dB lower than the maximum are denoted by $f_L$ and $f_H$, the degree of coupling C barely depends on the frequency f in the frequency range between $f_H$ and $f_L$, where a signal can be transmitted without a change in the signal waveform, and therefore, this range is regarded as a signal band. $f_L$ is approximately $0.5 \times f_0$ and $f_H$ is approximately $1.5 \times f_0$, and therefore, the signal band $f_H$-$f_L$ is approximately $f_0$.

The communication speed is proportional to the signal band, and therefore, the smaller the transmission line length L is, the broader the band is, thereby making the communication speed faster. Thus, the length $L_c$ of the transmission line coupler is determined by the demand on the signal band.

When two transmission lines are coupled to each other, the signal that flows through the two transmission lines can be represented by the synthesis of the signals in the same direction (the two change from low to high) and the signals in the opposite direction (when one changes from low to high, the other changes from high to low).

That is to say, the signals $V_1$ and $V_2$ of the line $24_1$ and the line $24_2$ are as follows when the signal component that propagates in the odd mode is $V_{odd}$ and the signal component that propagates in the even mode is $V_{even}$:

$$V_{odd} = V_1 - V_2, \quad V_{even} = 0.5(V_1 + V_2)$$

Therefore, $V_1$ and $V_2$ can be represented as follows:

$$V_1 = V_{even} + 0.5 V_{odd}, \quad V_2 = V_{even} - 0.5 V_{odd}$$

The characteristic impedance of a pair of transmission lines for signals in the same phase is referred to as even mode impedance $Z_{0e}$, while the characteristic impedance of a pair of transmission lines for signals in opposite phases is referred to as odd mode impedance $Z_{0o}$. In the even mode, signals change in the same phase, and therefore, the capacitance between the lines is effectively reduced as compared to the odd mode where signals change in the opposite phase. The impedance is inversely proportional to the capacitance, and therefore, the even mode impedance $Z_{0e}$ is greater than the odd mode impedance $Z_{0o}$. The greater this difference is, the greater the value of the degree of coupling C is, that is to say, the stronger the degree of coupling is. Here, the characteristic impedance Z of a transmission line can be represented in the following using $Z_{0e}$ and $Z_{0o}$:

$$Z = (Z_{0e} \times Z_{0o})^{1/2}$$

The decibel indication value of the degree of coupling C can be represented in the following when $Z_{0e}$ is the characteristic impedance of a pair of transmission lines in the even mode and $Z_{0o}$ is the characteristic impedance of a pair of transmission lines in the odd mode:

$$C = 20 \log|(Z_{0e} - Z_{0o})/(Z_{0e} + Z_{0o})|$$

Naturally, the greater the distance d is, the smaller the degree of coupling is. Accordingly, the degree of coupling C is designed by varying the distance d of the coupler, while the impedance $Z_c$ can be designed by varying the line width $W_c$ of each coupler.

Figure 10A:
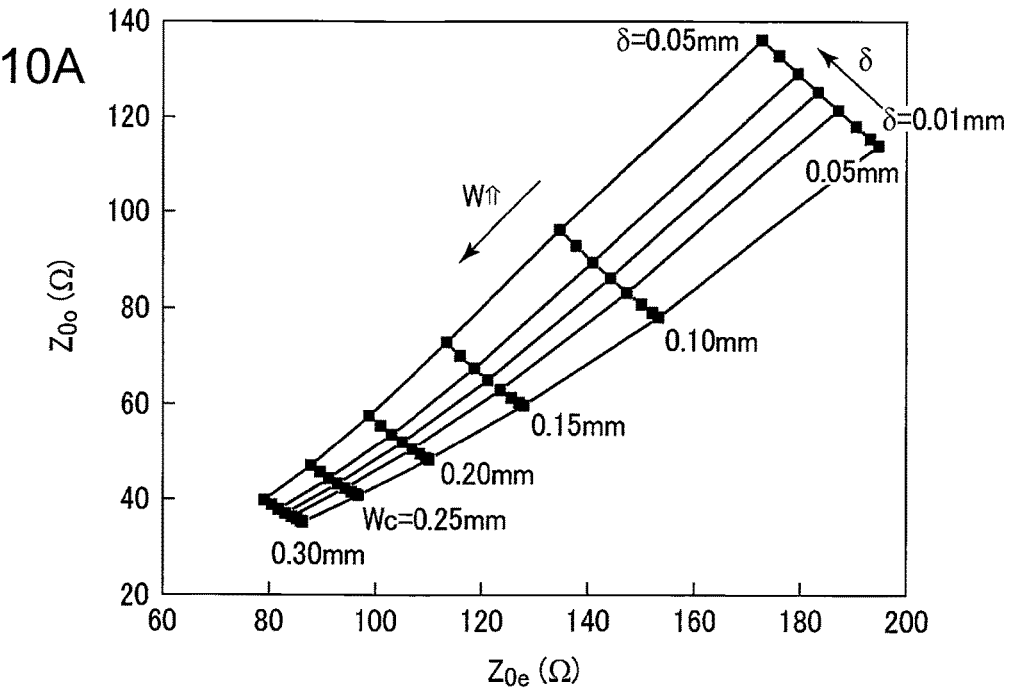
FIGS. 10A and 10B are graphs showing the correlation between the size and characteristics of a directional coupler.
Figure 10B:
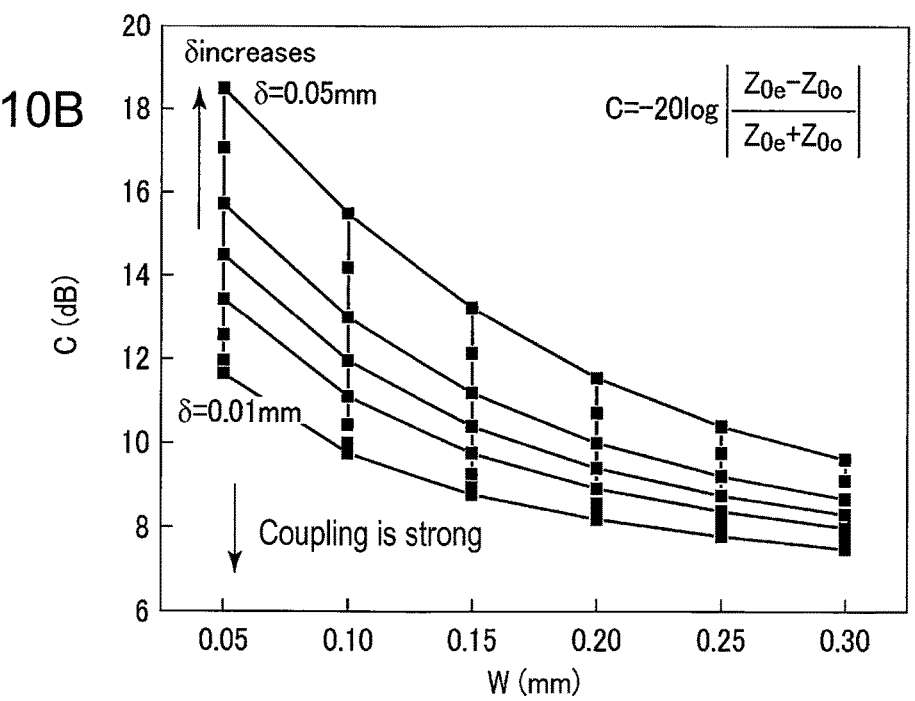

FIGS. 10A and 10B are graphs showing the correlation between the size and the characteristics of a directional coupler, where the above-described relationships are shown as the results of the search using an electromagnetic field analysis simulator. When the distance d is given and the line width W varies, the degree of coupling C and the impedance Z change. The greater W is, the lower the impedance is as shown in FIG. 10A and the stronger the coupling is as shown in FIG. 10B.

In addition, the greater the position of a transmission line shifts, the weaker the coupling is. In the case where a transmission line shifts by approximately ⅕ of the width of the transmission line, for example, $\delta = 0.06$ mm when $W = 0.3$ mm, however, the degree of coupling is lower by approximately 6 dB, which is approximately half.

Figure 11:
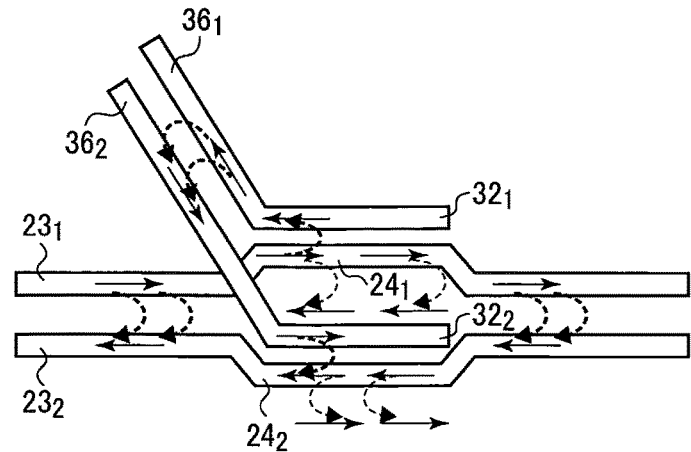
FIG. 11 is a diagram showing paths for signal currents and return currents.

FIG. 11 is a diagram showing the paths of signal currents and return currents where differential lines $23_1$ and $23_2$ for creating bus lines on the main board are in close proximity to each other and coupled, and therefore, one allows a return current of the other to flow, and thus, allows a differential signal to propagate. After entering the coupler, the distance $S_c$ between the line $24_1$ and the line $24_2$ is great, which makes the coupling weak, and therefore, the respective return currents flow separately through the plane.

At the same time, when the coupling end on a child board is in close proximity and coupled to a coupling end on the main board, a return current that is part of the current that flows through the line $24_1$ flows through the line $32_1$, while a return current that is part of the current that flows through the line $24_2$ flows through the line $32_2$. One of the currents that flow through the line $32_1$ and the line $32_2$ allows a return current of the other to flow through so as to allow a differential signal to propagate because the line $36_1$ and the line $36_2$ that create stub lines on the child board are in close proximity and coupled to each other.

Figure 12:
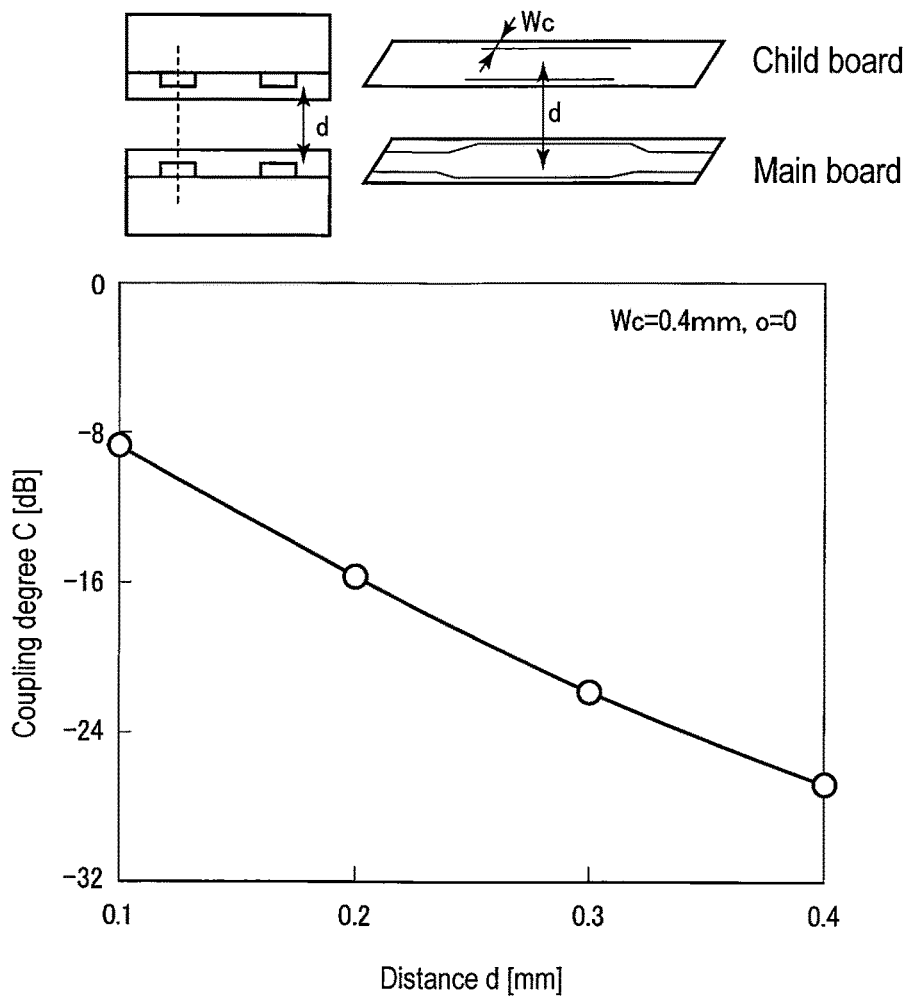
FIG. 12 is a diagram showing the correlation between the degree of coupling and the distance in a directional coupling portion.

FIG. 12 is a diagram showing the correlation between the degree of coupling and the distance in a directional coupling portion, where the results of measurement for a directional coupler that has actually been prepared with the following dimensions of each part are shown:

$W = 0.4$ mm, $S = 0.26$ mm, $W_c = 0.4$ mm, $S_c = 1.06$ mm, $L_c = 5$ mm, and $h = 0.5$ mm.

The correlation between the degree of coupling and the distance in a directional coupling portion can be shown as data in the following table on the basis of the results of measurement in FIG. 12. Here, the numerals are gained as a result of linear approximation, and therefore, errors are included.

TABLE 1

| Distance d | Degree of Coupling C. |
|---|---|
| 0.100 mm | −9.6 dB (0.331≈1/3) |
| 0.125 mm | −11.2 dB (0.275≈1/3.6) |
| 0.150 mm | −12.7 dB (0.232≈1/4.3) |
| 0.175 mm | −14.3 dB (0.193≈1/5.2) |
| 0.200 mm | −16.0 dB (0.158≈1/6.3) |
| 0.225 mm | −17.6 dB (0.132≈1/7.6) |
| 0.250 mm | −19.2 dB (0.110≈1/9.1) |
| 0.275 mm | −20.8 dB (0.091≈1/11.0) |
| 0.300 mm | −22.4 dB (0.076≈1/13.2) |

When the distance d of each memory module is $d_1=0.20$ mm, $d_2=0.175$ mm, $d_3=0.150$ mm, $d_4=0.125$ mm, and $d_5=0.100$ mm, for example, the signal power (equal to the signal voltage) divided to each memory module is as follows in accordance with the above table, and thus, the power that is approximately ⅙ of the transmitted power can be distributed to each memory module. The results are close to the setting of the degree of coupling illustrated in FIG. 6A.

Memory module #1: 1×0.158=0.158

Memory module #2: (1−0.158)×0.193=0.163

Memory module #3: (0.842−0.163)×0.232=0.158

Memory module #4: (0.679−0.158)×0.275=0.143

Memory module #5: (0.521−0.143)×0.331=0.125

Terminal: 0.378×(1−0.331)=0.252

Alternatively, when $d_1=0.30$ mm, $d_2=0.275$ mm, $d_3=0.250$ mm, $d_4=0.225$ mm, and $d_5=0.200$ mm, the signal power (equal to the signal voltage) divided to each memory module is as follows, and thus, the power that is approximately 1/10 of the transmitted power can be distributed to each memory module. The results are close to the setting of the degree of coupling illustrated in FIG. 6B.

Memory module #1: 1×0.076=0.076

Memory module #2: (1−0.076)×0.091=0.084

Memory module #3: (0.924−0.084)×0.110=0.092

Memory module #4: (0.840−0.092)×0.132=0.099

Memory module #5: (0.748−0.099)×0.158=0.103

Terminal: 0.649×(1−0.158)=0.546

Figure 13:
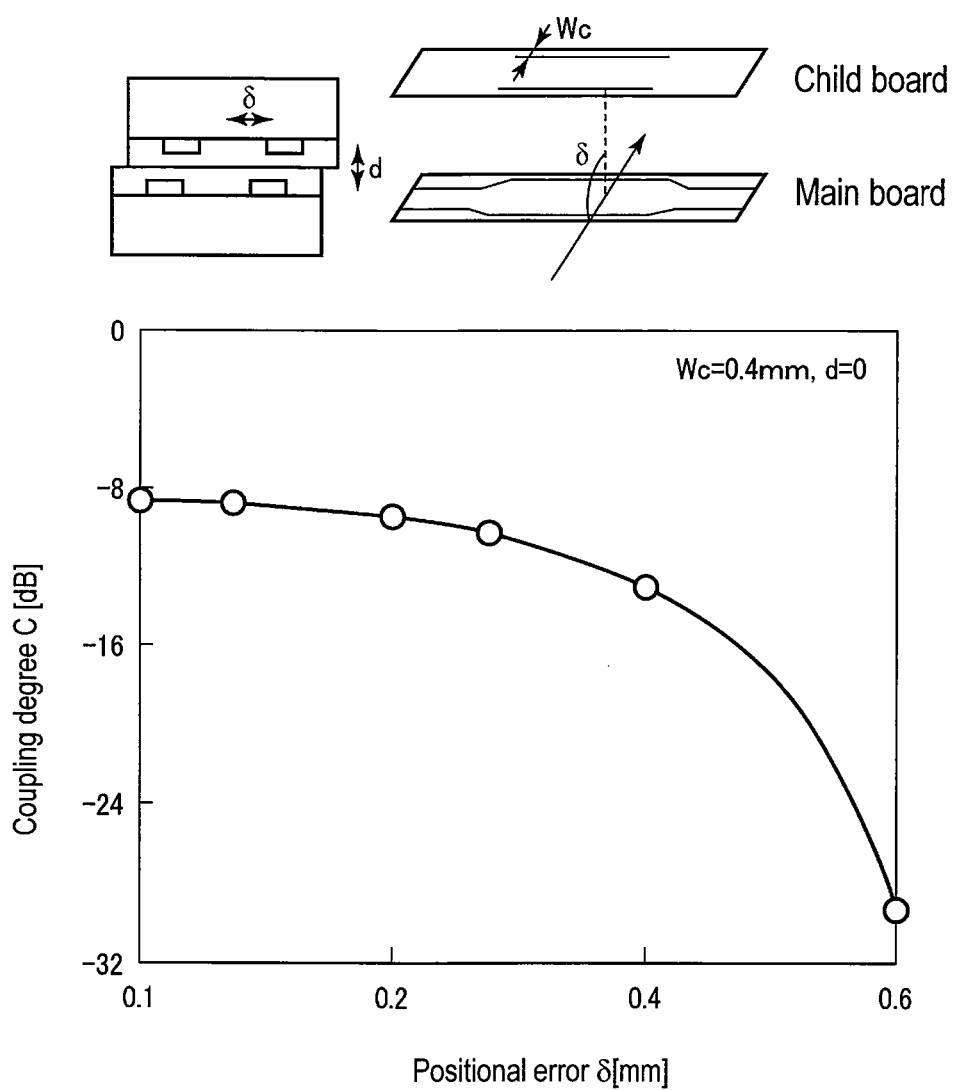
FIG. 13 is a diagram showing the correlation between the degree of coupling and the positional error in a directional coupler.

FIG. 13 is a diagram showing the correlation between the degree of coupling and the positional error in a directional coupler, where the results of measurement for a directional coupler that has actually been prepared when the line width $W_c=0.4$ mm and the distance d=0 as described in the above are shown. As shown in the figure, the degree of coupling lowers by approximately 4 dB at the maximum, that is to say, becomes only approximately 0.6 times smaller, even in the case where a line is arranged with a shift within a range of the width $W_c$ (≤0.4 mm). Meanwhile, the degree of coupling dramatically lowers in the case where a line is arranged with a shift of the line width or greater (>0.4 mm).

Accordingly, it can be seen that a coupler of which the width is greater than the positional error d of a child board, that is to say, $W_c>\delta$, may be used.

Figure 14:
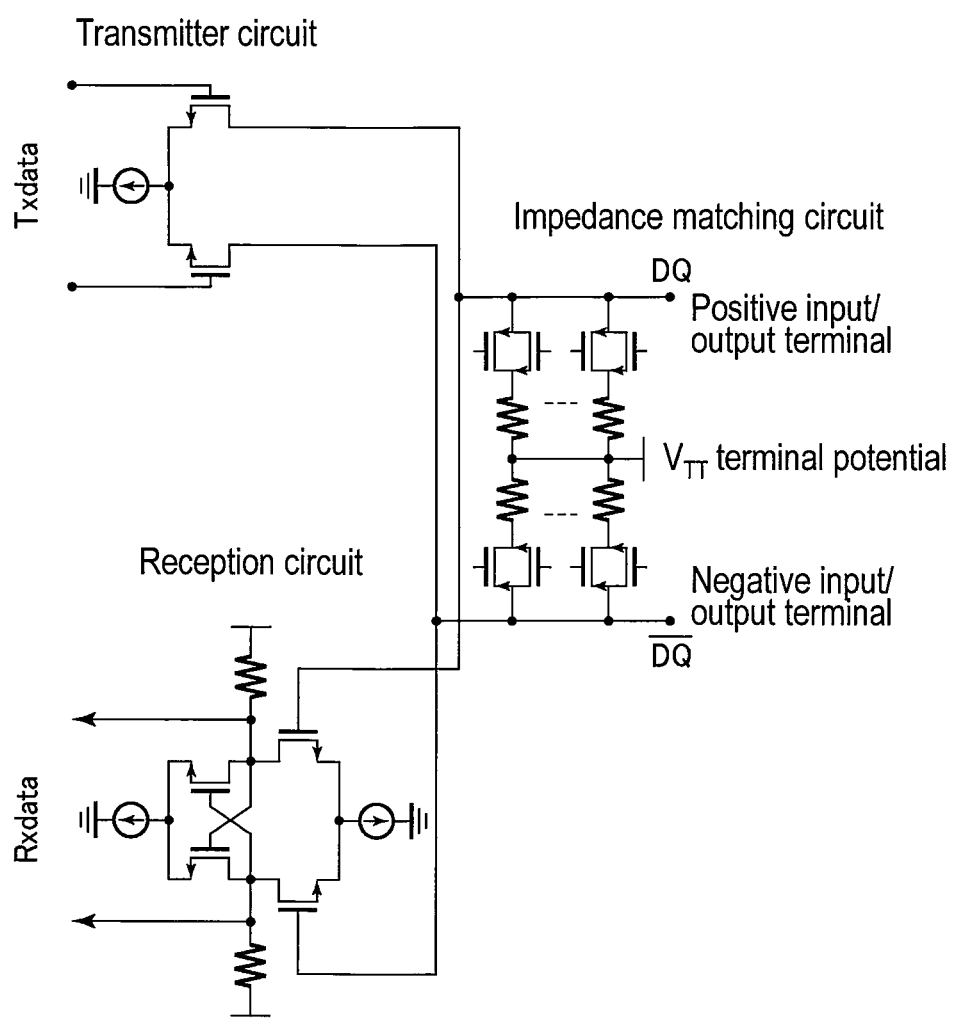
FIG. 14 is a circuit diagram showing an example of a transmitter/receiver circuit used in the directional coupling-type multi-drop bus according to Example 1 of the present invention.

FIG. 14 is a circuit diagram showing the structure of an example of the transmitter/receiver circuit used in the directional coupling-type multi-drop bus according to Example 1 of the present invention. The transmitter circuit is a circuit for transmitting a differential signal of a current in response to the transmitted data. A first derivative is carried out on the transmitted signal when passing through the directional coupler, and thus, the signal attenuates in accordance with the degree of coupling. The receiver circuit restores the signal to the original data by using a comparator having hysteresis. The impedance matching circuit digitally corrects the differential impedance of the input/output terminals to which the transmitter/receiver is connected.

FIGS. 15A and 15B are diagrams showing waveforms of the received signal that is measured on a child board, where FIG. 15A shows the received signal waveform in the case where the degree of coupling C is constant, and FIG. 15B shows the received signal waveform in the case where the signal is divided equally by varying the degree of coupling C. Here, the results of measurement are shown for a multi-drop bus where a transmitter/receiver chip, a main board, and five child boards have actually been fabricated and assembled, when W=0.4 mm, S=0.26 mm, $W_c=0.4$ mm, $S_c=1.06$ mm, $L_c=5$ mm, and h=0.5 mm.

As shown in FIG. 15A, the signal received by a memory module that is further away is too small to be determined in the case where the degree of coupling C is constant for each memory module. Meanwhile, as shown in FIG. 15B, the power of the received signal is almost equal for any memory module, and thus, can be determined in the case where the degree of coupling is varied for each memory module so that the signal is equally divided. As shown in FIG. 8B, matching of the coupling impedance also contributes to this.

Figure 16:
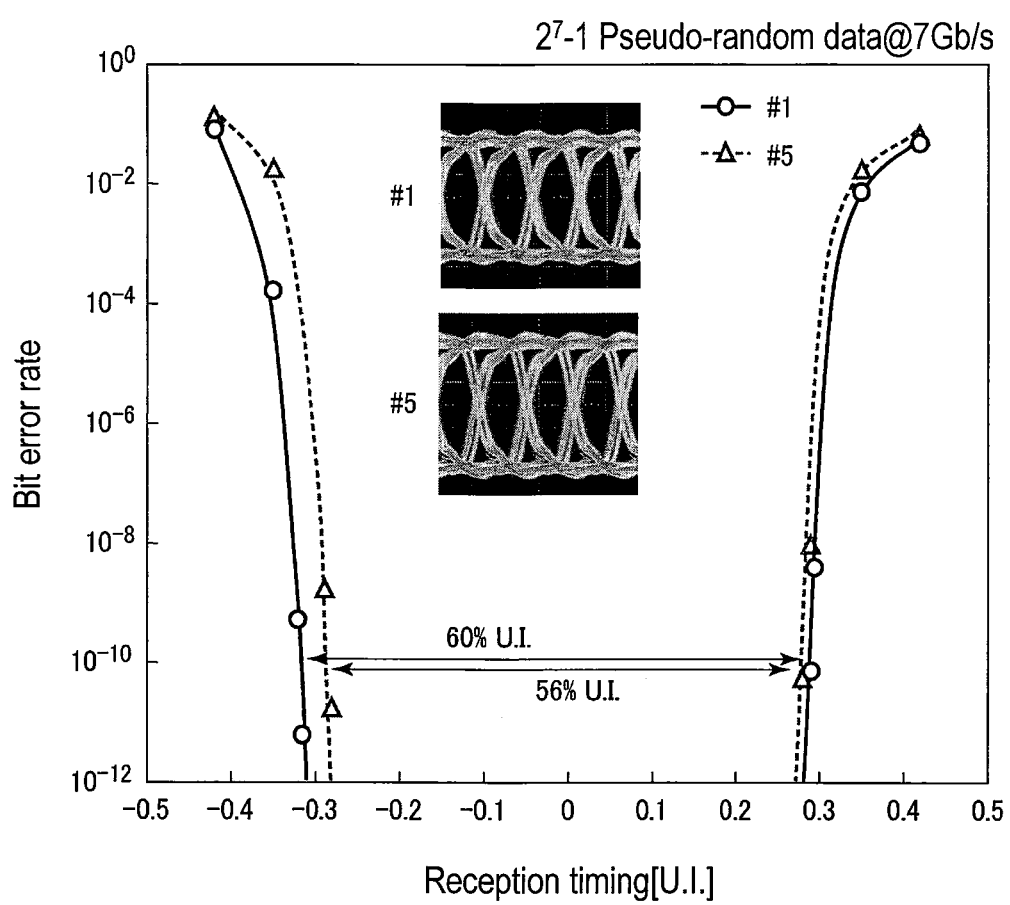
FIG. 16 is a waveform graph showing the results of measurement of the bit error rate and the reception timing when the signal power is equally divided by adjusting the degree of coupling for each memory module.

FIG. 16 is a graph showing the results of measurement for the bit error rate and the reception timing when the degree of coupling is adjusted for each memory module so that the signal power is divided equally, where the results of measurement are shown for the memory module #1 that is the closest to the transmitter/receiver chip and the memory module #5 that is the farthest from the transmitter/receiver chip.

As shown in the figure, as a result of measurement using $2^7-1$ pseudo-random data of 7 Gbps, the bit error rate at the time of data communication is $10^{-12}$ or less, and a margin of the reception timing is 50% or more of the period [U. I.]. Here, 7 Gbps is the fastest speed in the world as the data transfer speed through a multi-drop bus at present (January 2012).

Thus, in Example 1 of the present invention, the differential impedance $Z_c$ at the coupler end on the main board side before a memory module is mounted in one directional coupler is preset large enough that the differential impedance $Z_{c\text{-}coupled}$ after mounting becomes equal to the impedance Z of the differential lines, and therefore, the impedance can be matched at the time of operation, and as a result, it is possible to propagate a signal at a high speed. Here, it is general for the directional coupler where the impedance is matched to be a directional coupler having the highest degree of coupling. In the case where the number of memory modules that are mounted is small, the impedance may be matched in a directional coupler that is close to the middle.

In addition, the degree of coupling C is equally divided to each memory module by varying the thickness of the organic insulating film that is interposed between the main board and the child boards, and therefore, a signal waveform that can be determined can be received by each memory module, which makes it possible to lower the power consumption, and at the same time, can greatly increase the reliability of signal transmission.

Furthermore, the distance $S_c$ between the lines in a coupler portion is greater than the distance h between the lines and the plate, and therefore, it is easy to control the impedance, and at the same time, the impedance is affected less by the positional error at the time of the mounting of the memory module. The reliability of the signal transmission increases in this point.

Example 2

Figure 17:
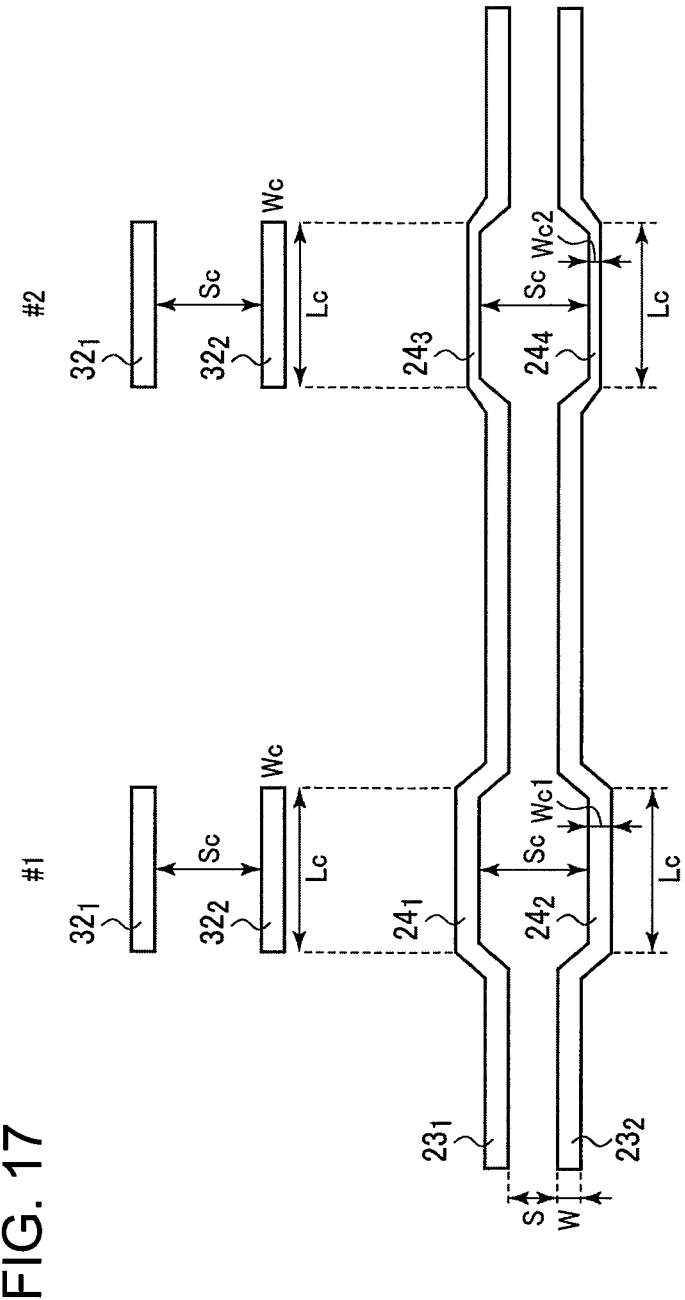
FIG. 17 is a plan diagram showing the directional coupling-type multi-drop bus according to Example 2 of the present invention.

Next, the directional coupling-type multi-drop bus according to Example 2 of the present invention is described in reference to FIG. 17. The impedance is adjusted by varying the line width in a coupler portion in Example 2. FIG. 17 is a plan diagram showing the directional coupling-type multi-drop bus according to Example 2 of the present invention, where the greater the degree of coupling is, that is to say, the farther away the coupler is from the transmitter/receiver chip, the smaller the line width $W_c$ of the coupler end on the main board side is, and the remaining portions are the same as in Example 1. Here, the child board in each coupler portion is the same as in Example 1. That is to say, any memory module may be mounted in any location on the main board.

In this case, the line width $W_c$ of the coupler on the main board side is set as follows:

$$W_{c1} \geq W_{c2} \geq W_{c3} \geq W_{c4} \geq W_{c5}, \text{ where } M_{c1} > W_{c5}.$$

When the line width $W_c$ of a coupler is smaller, the impedance is greater as shown in FIG. 10B, and therefore, the impedance in each coupler before coupling satisfies the following:

$$Z_{c1} \leq Z_{c2} \leq Z_{c3} \leq Z_{c4} \leq Z_{c5}, \text{ where } Z_{c1} < Z_{c5}.$$

The degree of coupling C is set as follows so that the farther away the coupler is from the transmitter/receiver chip, the greater the impedance is as described above.

$$C1 \leq C2 \leq C3 \leq C4 \leq C5, \text{ where } C_1 < C_5.$$

The greater the degree of coupling C is, the more the impedance lowers at the time of coupling, and as a result, the impedance $Z_{c\text{-}coupled}$ at the time of coupling matches the differential impedance Z of the differential lines in all the couplers. That is to say, the following is satisfied:

$$Z_{c1\text{-}coupled} = Z_{c2\text{-}coupled} = Z_{c3\text{-}coupled} = Z_{c4\text{-}coupled} = Z_{c5\text{-}coupled} = Z$$

Figure 18:
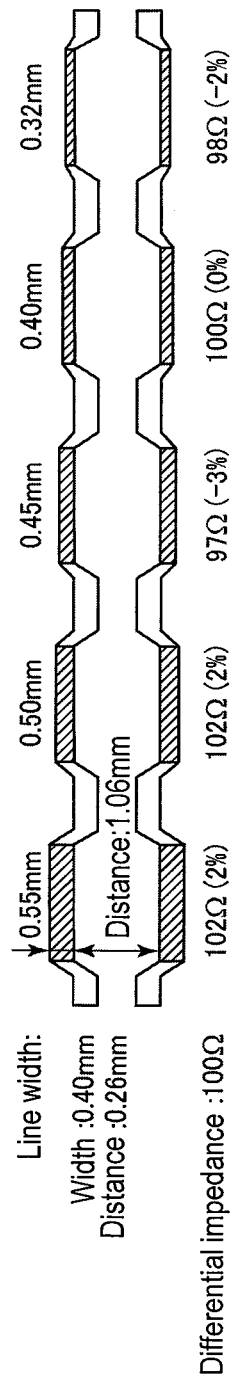
FIG. 18 is a diagram showing the coupling impedance matching in Example 2 of the present invention.

FIG. 18 is a diagram showing the coupling impedance matching in Example 2 of the present invention. The results of electrical field simulation shows that the entire coupling impedance can be adjusted within the range of +/−3% by setting the line width $W_c$ of each directional coupler as shown in the figure. Here, in reality, there is a positional error and dispersion in the size, and therefore, the coupling impedance is within the range of +/−5%.

When the degree of coupling C is set to −9.6 dB by making the distance d 0.1 mm and when the degree of coupling C is set to −16.0 dB by making the distance d 0.2 mm, the reflective coefficient $S_{11}$ on the main board side in the band center frequency (7 GHz) is found through electromagnetic field analysis simulation in the following in the case where $W_c$ is set to 0.40 mm and in the case where $W_c$ is set to 0.25 mm.

TABLE 2

| Distance d | Degree of Coupling C. | $W_c$ = 0.40 mm | $W_c$ = 0.25 mm |
|---|---|---|---|
| 0.10 mm | −9.6 dB | −18 dB | −22 dB |
| 0.20 mm | −16.0 dB | −26 dB | −28 dB |
| 0.25 mm | −19.2 dB | −31 dB | −27 dB |

It is shown that the reflective coefficient is smaller ($S_{11}$=−22 dB<−18 dB) and the impedance is matched better for the lines $24_3$ and $24_4$ of which the width at the coupler end on the main board side is smaller ($W_c$=0.25 mm) when the distance is smaller (d=0.1 mm) and the coupling is stronger (C=−9.6 dB). Meanwhile, it is shown that the reflective coefficient is smaller ($S_{11}$=−31 dB<−27 dB) and the impedance is matched better for the lines $24_1$ and $24_2$ of which the width at the coupler end on the main board side is greater ($W_c$=0.40 mm) when the distance is greater (d=0.25 mm) and the coupling is weaker (C=−19.2 dB).

Here, the coupler end of the child board may be varied in the same manner as for the main board, and as a result, the impedance and the degree of coupling can be controlled more precisely, which is an advantage. Here, a dedicated memory module is mounted on each mounting position, and thus, there is a disadvantage that the same memory module cannot be used for a different mounting position.

Example 3

Figure 19:
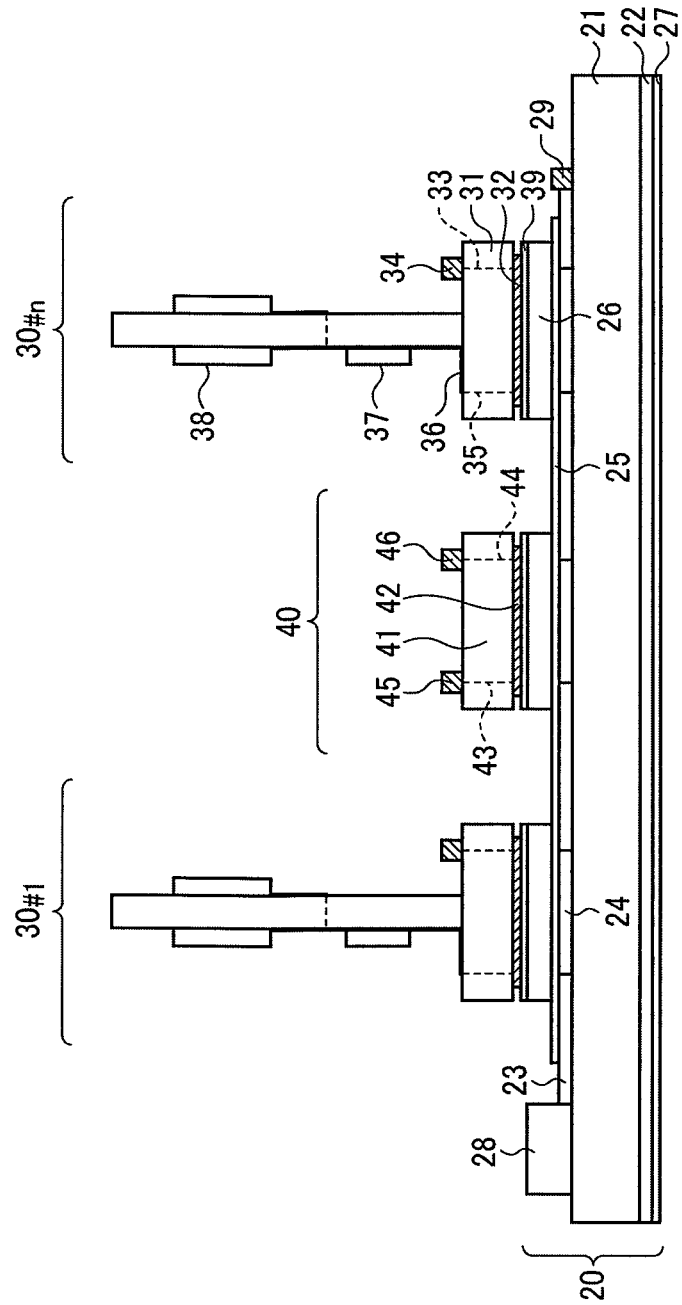
FIG. 19 is a cross-sectional diagram showing the directional coupling-type multi-drop bus according to Example 3 of the present invention.
Figure 20:
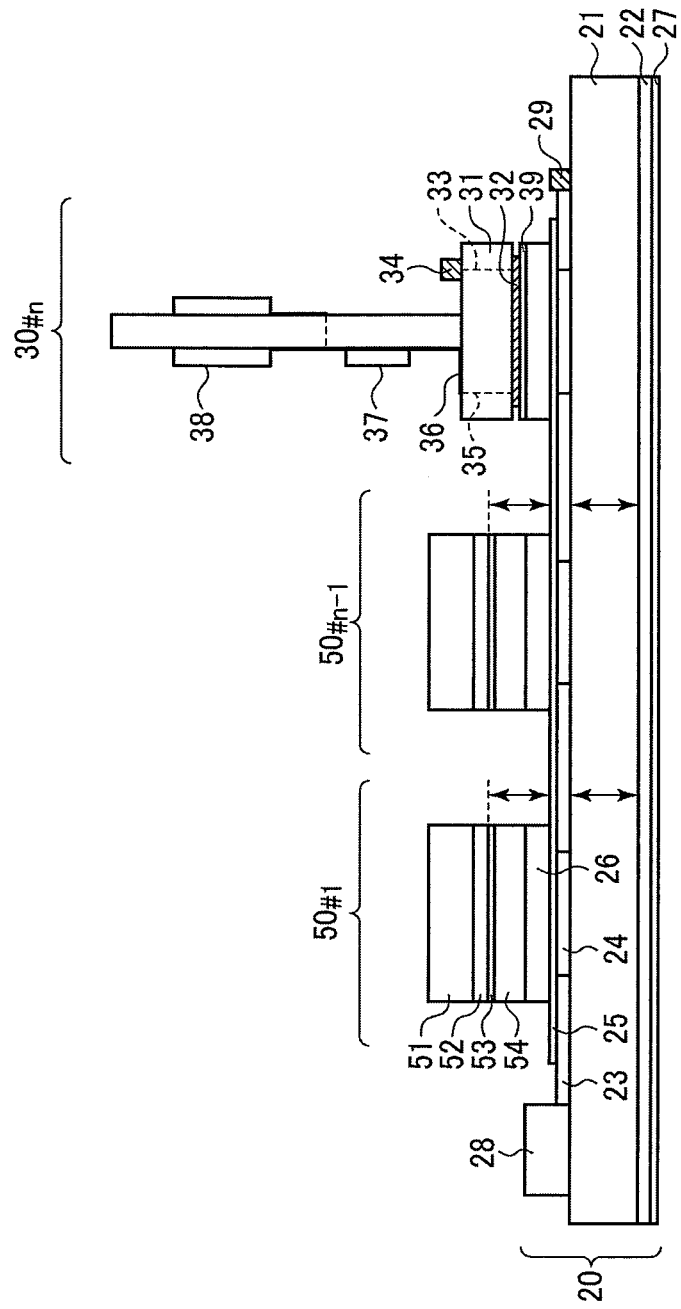
FIG. 20 is a cross-sectional diagram showing the directional coupling-type multi-drop bus according to Example 4 of the present invention.

Next, the directional coupling-type multi-drop bus according to Example 3 of the present invention is described in reference to FIG. 19. In Example 3, the portions where a module is not mounted are not provided with a memory or a transmitter/receiver circuit, and a child board for a terminal having only a coupler and a terminal resistor is mounted. FIG. 19 is a cross-sectional diagram showing the directional coupling-type multi-drop bus according to Example 3 of the present invention, and a board for a terminal, that is to say, a terminal module 40, is mounted on a location where a memory module is not mounted. The remaining structure is the same as in Example 1. Though memory modules are mounted on both sides in this figure, memory modules may be mounted starting from an end in the order in which the degree of coupling of the directional coupler is greater as shown in FIG. 20.

This terminal module 40 is provided with a child board 41 that is the same as for the memory module 30, a coupler end 42, and terminal resistors 45 and 46 for terminating the two ends of the coupler end 42, and a transmitter/receiver chip or a DRAM is not mounted on the terminal module 40 to which the terminal potential is provided from the main board 20. Here, symbols 43 and 44 are via wires.

The system is designed so that the impedance of a coupling portion lowers so as to match the impedance of the bus when a memory module 30 is mounted, and therefore, the impedance is high and not matched when a memory module 30 is not mounted. The impedance of the bus can be matched for data transfer at a higher speed by mounting a terminal module 40 on a place where a memory module 30 is not mounted. Though the terminal resistor 45 on the forward direction side of the terminal module 40 can be omitted, it is desirable not to omit it, taking into consideration the fact that the signal is slightly coupled in the forward direction.

Thus, a terminal module is mounted in a coupler portion where a memory module is not mounted in Example 3 of the present invention, and therefore, the impedance of the bus can be matched without adjusting the number of coupler ends on the main board even in the case where the number of required memory modules is small.

Example 4

Next, the directional coupling-type multi-drop bus according to Example 4 of the present invention is described in reference to FIG. 20. In Example 4, the plane on the main board is removed only from the coupling portions so that a child board having a plane is mounted on a portion on which a module is not mounted so as to work as a plane for the bus coupler.

FIG. 20 is a cross-sectional diagram showing the directional coupling-type multi-drop bus according to Example 4 of the present invention, where the rear surface of a coupling portion on the main board 20 provides a missing portion of the plane 22. In addition, memory modules 30 are mounted sequentially starting from a place where the degree of coupling is stronger, that is to say, a place farther away from the transmitter/receiver chip, and a plane module 50 is mounted on a place on which a memory module 30 is not mounted. The remaining points are the same as in Example 1. The farther away a high-frequency signal is from the transmitter/receiver chip 28 on the main board 20, the easier it attenuates, and therefore, memory modules 30 may be mounted as in FIG. 19.

On the rear surface of the child board 51, plane modules 50 are provided with a plane 52, an organic insulating film 53 such as of a solder resist, and an organic insulating film 54 for adjusting the thickness so that the plane potential (typically, grounded) is given from the main board 20.

The system is designed so that the impedance of a coupling portion lowers so as to match the impedance of the bus when a memory module 30 is mounted, and therefore, the impedance is high and not matched when a memory module 30 is not mounted. The thickness of the organic insulating film 54 in a plane module 50 is determined so that the impedance of the bus can be matched by mounting the plane module 50 on a place where a memory module 30 is not mounted.

The farther away a coupler is from the transmitter/receiver chip 28 on the main board 20, the higher the impedance of the coupler is set, and therefore, the thickness of the organic insulating film 54 in the plane module 50 is determined so that the farther away the plane module 50 is placed, the shorter the distance between the coupler end 24 on the main board 20 and the plane 52 in the plane module 50 is.

Example 5

Figure 21:
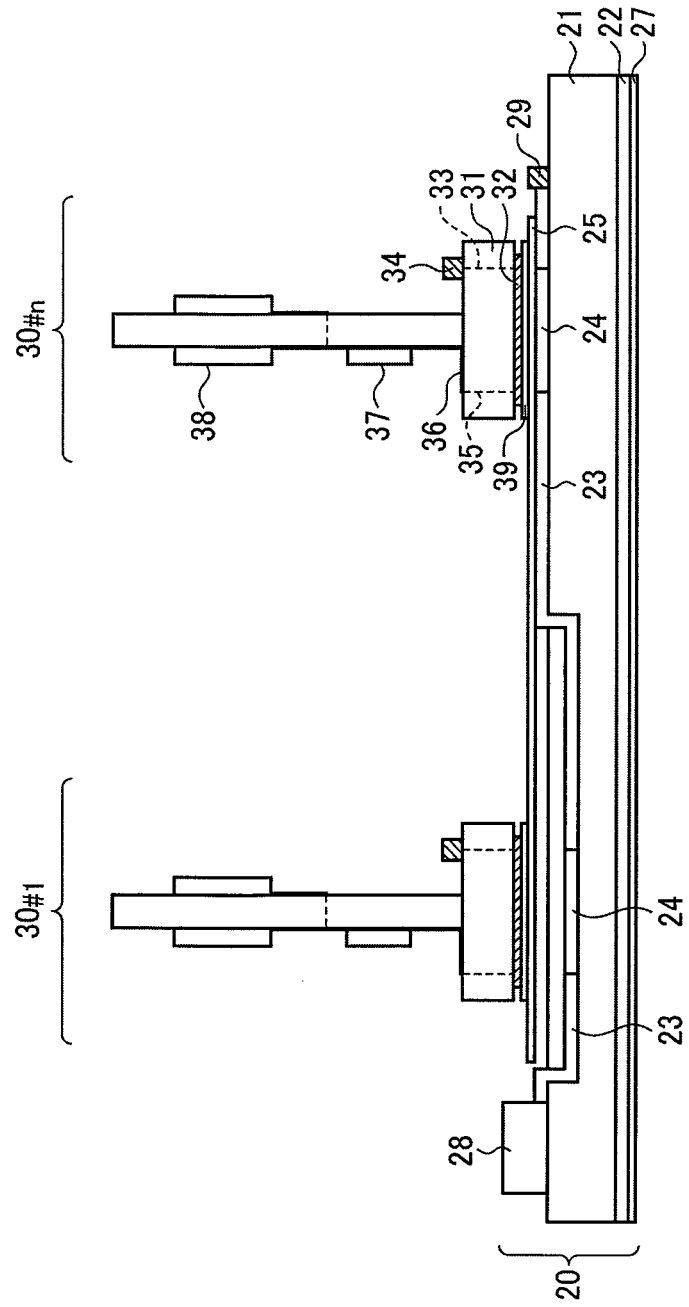
FIG. 21 is a cross-sectional diagram showing the directional coupling-type multi-drop bus according to Example 5 of the present invention.

Next, the directional coupling-type multi-drop bus according to Example 5 of the present invention is described in reference to FIG. 21. In Example 5, the main board has a multilayer wiring structure, and the distance d is varied by changing the level of the layer of the wires used in the differential wires or the coupler end.

FIG. 21 is a cross-sectional diagram showing the directional coupling-type multi-drop bus according to Example 5 of the present invention, where a multilayer wired board having four or more layers is used for the main board 20 so that the distance d vis-à-vis the coupler is varied by selecting wires in whichever layer is used to form the coupler end. The remaining structure is the same as in Example 1.

Though the cost for forming an organic insulating film through deposition becomes unnecessary as compared to the method for forming an organic insulating film through deposition on the surface of the main board in Example 1, it is difficult to finely adjust the distance d vis-à-vis the coupler. Accordingly, two or more coupler ends may be formed of wires in the same level of the layer, and even this structure can gain excellent properties as compared to the case where the degree of coupling C is the same for all the couplers.

Example 6

Figure 22:
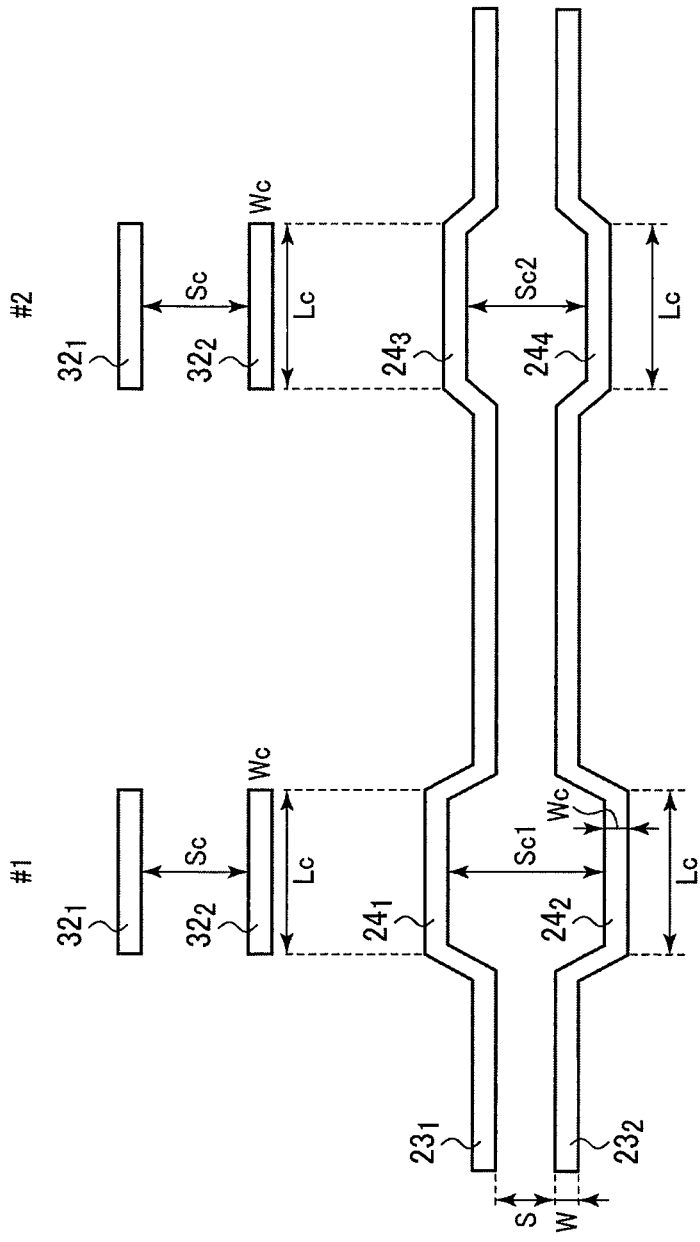
FIG. 22 is a cross-sectional diagram showing the directional coupling-type multi-drop bus according to Example 6 of the present invention.

Next, the directional coupling-type multi-drop bus according to Example 6 of the present invention is described in reference to FIG. 22. In Example 6, the degree of coupling C is varied by changing the distance between couplers on the main board, and the remaining structure is the same as in Example 1.

FIG. 22 is a plan diagram showing the directional coupling-type multi-drop bus according to Example 6 of the present invention, where the degree of coupling C is adjusted by providing a structure where the closer the couplers are to the transmitter/receiver chip 28 on the main board side, the greater the distance $S_{ck}$ (k=1, 2, ..., n-1) between coupler ends 24 is as compared to the distance $S_c$ of a coupler end 32 on the child board side.

As shown in FIG. 13, the greater the positional shift is between the two coupler ends, the lower the degree of coupling is, and therefore, the distance $S_{ck}$ at the coupler end 24 on the main board side is set as follows:

$$S_{c1} \geq S_{c2} \geq S_{c3} \geq S_{c4} \geq S_{c5}(=S_c), \text{ where } S_{c1} > S_{c5}.$$

The system is affected in a more complex manner by the precision in alignment as compared to the method in Example 1.

The invention claimed is:

1. A directional coupling-type multi-drop bus, comprising:
   a first module comprising:
   n first coupler ends provided on a surface of a first board and aligned in such an order that satisfies: $Z_{ja}$ ($Z_{1a} \leq Z_{2a} \leq \ldots \leq Z_{na}$),
   wherein $Z_{ja}$ is a differential characteristic impedance of the respective first coupler ends;
   a first semiconductor integrated circuit device having a transmitter/receiver circuit of which a differential input/output impedance is $Z_{0a}$ ($Z_{0a} < Z_{1a}$);
   a first terminal member of which a differential impedance is $Z_{0a}$; and
   a plane provided on a rear surface of said first board, wherein
   said first semiconductor integrated circuit device, said n coupler ends, and said first terminal member are linked together in this order with connection lines of which the differential characteristic impedance is $Z_{0a}$; and
   a second module comprising:
   a second coupler end of which the differential characteristic impedance is $Z_{1b}$;
   a second semiconductor integrated circuit device of which the differential input/output impedance is $Z_{0b}$ ($Z_{0b} < Z_{1b}$); and a second terminal member of which the differential impedance is $Z_{0b}$, wherein said second semiconductor integrated circuit device, the second coupler end, and said second terminal member are linked together in this order with connection lines of which the differential characteristic impedance is $Z_{0b}$, wherein said second module is mounted on said first module so that one of the first coupler ends and said second coupler end are aligned in proximity so as to face each other and form a directional coupler, and coupling impedances $Z_{ja\text{-}coupled}$ and $Z_{1b\text{-}coupled}$ which reflect the proximity effects in coupling state of said directional coupler are within a range of +/−5% of $Z_{0a}$ and within a range of +/−5% of $Z_{0b}$, respectively.

2. The directional coupling-type multi-drop bus according to claim 1, wherein the second module includes n second modules and the second modules are mounted on said first module such that the respective second modules face corresponding one of the first coupler ends and such that the respective first coupler ends and corresponding one of the second coupler ends are aligned in proximity so as to face each other and form a directional coupler, and a coupling degree $C_j$ of respective directional couplers satisfies:

$C_1 \leq C_2 \leq \ldots \leq C_n$ (here, $C_1 < C_n$).

3. The directional coupling-type multi-drop bus according to claim 1, wherein distance between differential lines in one of the first coupler ends is the same or greater than the distance from the differential lines to said plane.

4. The directional coupling-type multi-drop bus according to claim 1, wherein the differential characteristic impedance $Z_{ja}$ of said first coupler ends is adjusted by line width of differential lines of said first coupler ends.

5. The directional coupling-type multi-drop bus according to claim 1, wherein the greater a coupling degree C of said directional coupler is, the higher the differential characteristic impedance $Z_{ja}$ of said first coupler ends before coupling is than the differential characteristic impedance $Z_{0a}$ of said connection lines.

6. The directional coupling-type multi-drop bus according to claim 5, wherein the second module includes a plurality of second modules and the second modules are mounted on said first module such that the respective second modules face corresponding one of the first coupler ends and such that the respective first coupler ends and corresponding one of the second coupler ends are aligned in proximity so as to face each other and form a directional coupler, and the coupling degree of each of said directional couplers is set higher as the directional coupler is farther away from said first semiconductor integrated circuit device, and at the same time, the farther away the first coupler end is from said first semiconductor integrated circuit device, the narrower the line width of differential lines in said first coupler end is.

7. The directional coupling-type multi-drop bus according to claim 2, wherein the coupling degree of each of said directional couplers is set so as to divide the signal power equally by changing distance d between the first coupler end and the second coupler end.

8. The directional coupling-type multi-drop bus according to claim 2, wherein distance d between the first coupler end and the second coupler end is adjusted by thickness of an insulating film provided between the first coupler end and the second coupler end.

9. The directional coupling-type multi-drop bus according to claim 2, wherein distance d between the first coupler end and the second coupler end is adjusted by level of a layer of multilayer wires provided on said first board.

10. The directional coupling-type multi-drop bus according to claim 2, wherein the farther away the first coupler end is from said first semiconductor integrated circuit device, the shorter a distance between differential lines in the first coupler end is.

11. The directional coupling-type multi-drop bus according to claim 1, wherein line width of differential lines in the first coupler end is wider than positional error of said second module relative to said first module.

12. The directional coupling-type multi-drop bus according to claim 11, wherein shape of said directional coupler is rectangular.

13. The directional coupling-type multi-drop bus according to claim 1, further comprising a terminal module mounted on another of the first connector ends, the terminal module including a coupler end having both ends each connected to a terminal resistor.

14. The directional coupling-type multi-drop bus according to claim 1, wherein the plane provided on the rear surface of said first board includes a missing portion in the location facing another of the first coupler ends, the missing portion misses the plane, and a plane module where a plane is provided instead of said second coupler end is mounted on the another of the first coupler ends.

15. The directional coupling-type multi-drop bus according to claim 1, wherein the second module includes a plurality of second modules to be mounted on said first module, the second modules all having the same characteristics and structure.

16. The directional coupling-type multi-drop bus according to claim 7, wherein the distance d between a first coupler end and the second coupler end is adjusted by thickness of an insulating film provided between the first coupler end and the second coupler end.

17. The directional coupling-type multi-drop bus according to claim 7, wherein the distance d between the first coupler end and the second coupler end is adjusted by level of a layer of multilayer wires provided on said first board.

18. The directional coupling-type multi-drop bus according to claim 7, wherein the farther away the first coupler end is from said first semiconductor integrated circuit device, the shorter a distance between differential lines in the first coupler end is.

* * * * *